US012222670B2

(12) United States Patent
Hamasaki

(10) Patent No.: US 12,222,670 B2
(45) Date of Patent: Feb. 11, 2025

(54) IMAGE FORMING APPARATUS

(71) Applicant: CANON KABUSHIKI KAISHA, Tokyo (JP)

(72) Inventor: Ryuji Hamasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/500,551

(22) Filed: Nov. 2, 2023

(65) Prior Publication Data

US 2024/0069486 A1 Feb. 29, 2024

Related U.S. Application Data

(63) Continuation of application No. 18/064,409, filed on Dec. 12, 2022, now Pat. No. 11,841,670.

(30) Foreign Application Priority Data

Dec. 20, 2021 (JP) ................................ 2021-205775

(51) Int. Cl.

*G03G 21/16* (2006.01)
*G03G 15/00* (2006.01)
*G03G 15/01* (2006.01)

(52) U.S. Cl.

CPC ..... *G03G 21/1619* (2013.01); *G03G 15/5075* (2013.01); *G03G 21/1642* (2013.01);

(Continued)

(58) Field of Classification Search

CPC ........... G03G 15/5075; G03G 21/1619; G03G 21/1647; G03G 15/0142; G03G 21/1604;

(Continued)

(56) References Cited

U.S. PATENT DOCUMENTS 7,826,753 B2 11/2010 Watanabe
9,207,628 B2 12/2015 Hoshino (Continued)

FOREIGN PATENT DOCUMENTS

JP 2008009293 A 1/2008
JP 6300605 B2 3/2018

(Continued)

OTHER PUBLICATIONS

Office Action issued in U.S. Appl. No. 18/064,409, mailed May 24, 2023.

(Continued)

*Primary Examiner* — Benjamin R Schmitt

(74) *Attorney, Agent, or Firm* — ROSSI, KIMMS & McDOWELL LLP

(57) ABSTRACT

An image forming apparatus includes the following: an image forming portion; a first metal side plate and a second metal side plate provided opposite each other with respect to the image forming portion; an antenna for communicating with external equipment; a housing including a top cover that is provided above the first metal side plate and the second metal side plate in a vertical direction, and a side cover that is provided on an outer side opposite to an inner side where the image forming portion is provided with respect to the first metal side plate, wherein the image forming apparatus further includes a support member provided on the first metal side plate, the support member including a housing support portion that supports at least one of the top cover and the side cover, and an antenna support portion that supports the antenna.

17 Claims, 22 Drawing Sheets

(52) U.S. Cl.
CPC ..... *G03G 21/1647* (2013.01); *G03G 15/0142* (2013.01); *G03G 21/1604* (2013.01); *G03G 2221/1651* (2013.01); *G03G 2221/1678* (2013.01)

(58) Field of Classification Search
CPC ....... G03G 21/1642; G03G 2221/1651; G03G 2221/1678
See application file for complete search history.

(56) References Cited

U.S. PATENT DOCUMENTS

| | | | |
|---|---|---|---|
| 10,126,703 | B2 | 11/2018 | Yuzawa |
| 11,165,921 | B2 | 11/2021 | Wada |
| 2014/0146334 | A1 | 5/2014 | Yuzawa |
| 2020/0310329 | A1 | 10/2020 | Shuhama et al. |
| 2021/0136243 | A1 | 5/2021 | Wada |

FOREIGN PATENT DOCUMENTS

| | | | |
|---|---|---|---|
| JP | 2021070263 | A | 5/2021 |
| JP | 2021094836 | A | 6/2021 |

OTHER PUBLICATIONS

Notice of Allowance issued in U.S. Appl. No. 18/064,409, mailed Sep. 19, 2023.

IMAGE FORMING APPARATUS

BACKGROUND OF THE INVENTION

Field of the Invention

The present invention relates to image forming apparatuses, which use an electrophotographic or electrostatic recording system, such as printers, photocopiers, or facsimiles.

Description of the Related Art

Image forming apparatuses such as laser printers of recent years now more commonly include, for better user convenience, a wireless communication portion so that users can send instructions for various operations such as printing and setting to the image forming apparatus using external equipment via wireless communication. Commonly, in the image forming apparatus a wireless communication portion is provided as an independent wireless communication substrate (wireless module) separately from a control substrate, and the wireless communication substrate is controlled by connecting the same with the control substrate. Since the wireless communication performance is readily affected by the position of the wireless communication substrate inside the image forming apparatus and peripheral components of the wireless communication substrate, it is preferable to dispose the substrate as near to the outside as possible in the apparatus, with as fewer components that may become obstacles as possible in the vicinity of the wireless communication substrate. Japanese Patent No. 6300605 discloses a configuration for securing good communication performance, in which the wireless communication substrate is biased and abutted to an outer casing cover so as to dispose the wireless communication substrate as near to the outside as possible in the image forming apparatus.

SUMMARY OF THE INVENTION

However, in the configuration in which the wireless communication substrate is directly or indirectly supported on an outer casing cover as disclosed in Japanese Patent No. 6300605, the impact applied from outside on the outer casing cover is transmitted directly to the wireless communication substrate. The outer casing cover is likely to be subjected to external forces particularly during transportation of the image forming apparatus. Such forces place the wireless communication substrate at a high risk of malfunctioning.

The present invention has been made in view of the circumstance, with an object to provide an image forming apparatus that performs wireless communication and has an ability to provide sturdier protection for the wireless communication substrate while securing good communication performance.

To achieve the above object, the image forming apparatus of the present invention includes the following:

an image forming portion configured to form an image on a recording material;

a first metal side plate and a second metal side plate provided opposite each other with respect to the image forming portion;

an antenna for communicating with external equipment; and a housing including a top cover that is provided above the first metal side plate and the second metal side plate in a vertical direction, and a side cover that is provided on an outer side opposite to an inner side where the image forming portion is provided with respect to the first metal side plate, wherein the image forming apparatus further comprises a support member provided on the first metal side plate, the support member including a housing support portion configured to support at least one of the top cover and the side cover, and an antenna support portion configured to support the antenna.

The present invention can provide an image forming apparatus that performs wireless communication and has an ability to provide sturdier protection for the wireless communication substrate while securing good communication performance.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

This embodiment describes a case where the invention is applied to a monochrome laser printer that can form monochrome images using an electrophotographic system. The present invention is applicable not only to this example but also to other copiers that use an electrostatic recording system or an inkjet recording system, color copiers with a tandem recording system, or printers.

In the following description, directions are defined in relation to the user who uses the image forming apparatus 100. Namely, the front side or near side, the back side or far side, the upper side or top side, and the lower side or bottom side of the image forming apparatus 100 as viewed from the user facing the apparatus and using it shall be referred to as "front," "rear," "upper," and "lower," respectively. The left side and right side of the image forming apparatus 100 as viewed from the front thereof shall be referred to as "left" and "right," respectively.

1. Overall Configuration of Image Forming Apparatus 100

Figure 1:
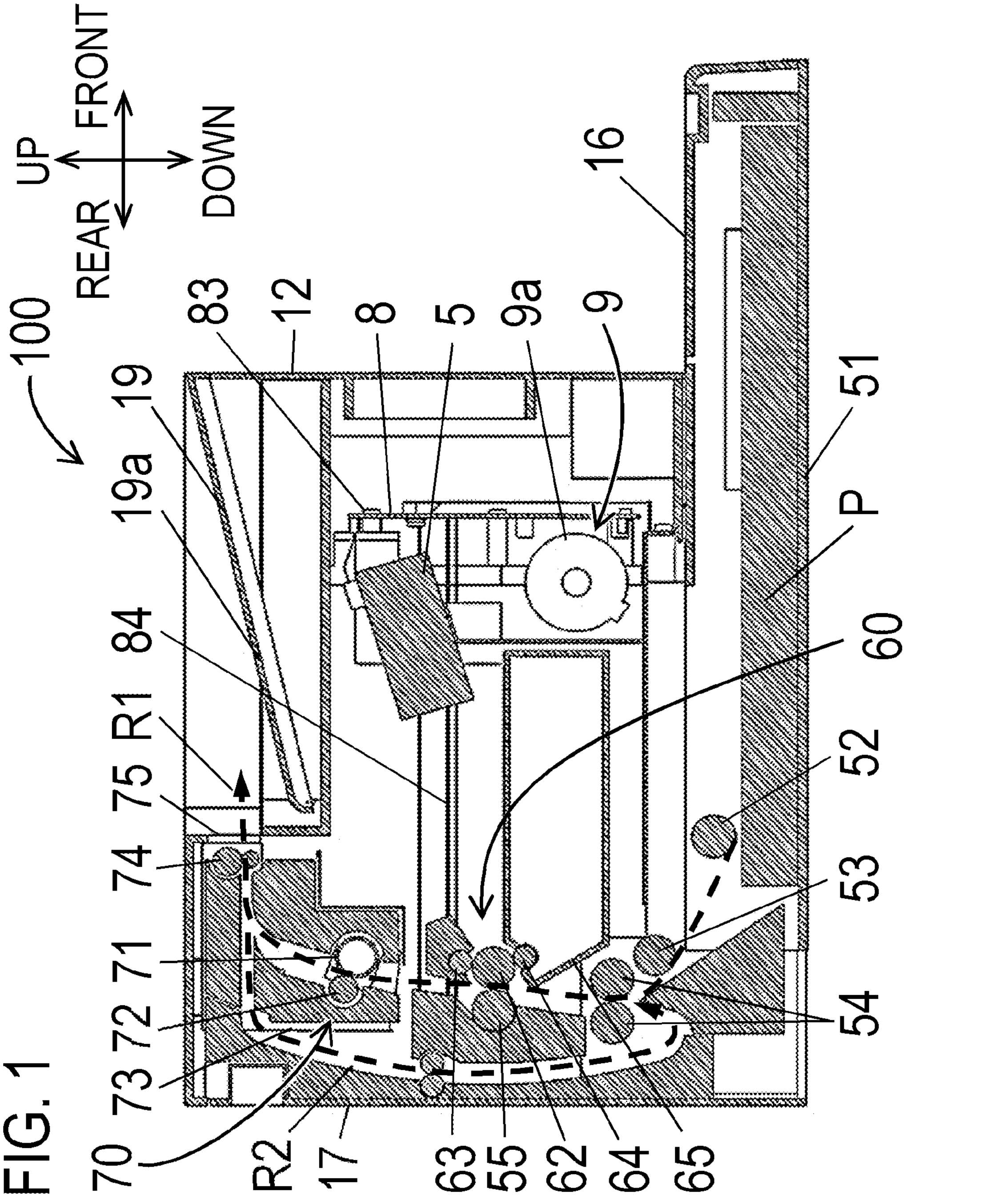
FIG. 1 is a diagrammatic cross-sectional view of an image forming apparatus according to a first embodiment.

First, the overall configuration of the image forming apparatus 100 is described. FIG. 1 is a diagrammatic cross-sectional view illustrating an overall configuration of the image forming apparatus 100 that uses an electrophotographic recording technique according to a first embodiment, as viewed from the left. The image forming apparatus 100 includes an image forming portion 60 and a fixing portion 70 supported by a metal frame 20, and forms monochrome images. The frame 20 will be described in detail later. The image forming apparatus 100 also includes a drive unit 9 that has a motor 9*a* for driving moving components such as rollers.

The image forming portion 60 includes a photosensitive drum 62 serving as an image bearing member, a charging roller 63, a developing roller 64, and a toner container 65. The image forming portion may be configured as a process cartridge to be removably mountable to the apparatus as a whole. Upon receiving image information, an image forming operation is started wherein the photosensitive drum 62 is rotated. First, the charging roller 63 charges the outer circumferential surface of the photosensitive drum 62 uniformly. This charged surface is then exposed by being irradiated with a laser beam from a laser scanner 5 in accordance with the image information, and thus an electrostatic latent image is formed. This latent image is developed by the developing roller 64, whereby a toner image is formed on the photosensitive drum surface. Sheet-like recording material P stored in a feeder cassette 51 in a lower part of the image forming apparatus 100 before image formation is separately fed one each from the feeder cassette 51 by a feeding roller 52 and a separation portion 53 to a pair of resist rollers 54. The pair of resist rollers 54 roll out the recording material P fed thereto toward a transfer nip portion between a transfer roller 55 and the photosensitive drum 62. A high voltage power supply portion 83 of an electrical unit 8 applies a bias to the transfer roller 55 via metal wire 84 when the recording material P passes through the transfer nip portion. This causes the monochrome toner image to be transferred from the surface of the photosensitive drum 62 onto the recording material P passing through the transfer nip portion in the image forming portion 60.

The recording material P carrying the toner image is transported to the fixing portion (image heating portion) 70. The fixing portion 70 includes a heating unit 71 having a heater set inside a flexible tubular film, a pressing roller 72 provided opposite the heating unit 71, and a fixing frame 73 made up of a plurality of frames. The fixing frame 73 includes a left sheet metal piece 73*a*, a right sheet metal piece 73*b*, and a backside sheet metal piece. Heat and pressure are applied to the recording material P transported to a fixing nip portion formed by the heating unit 71 and the pressing roller 72, whereby the toner image carried thereon is fixed to the recording material P. In the case with single-sided printing, the recording material P is then discharged to the outside of the image forming apparatus 100 (in the direction of arrow R1 in FIG. 1) by a discharge/reverse roller 74. The path followed by the recording material at this time shall be referred to as a single-side transfer path R1.

In the case with double-sided printing, the discharge/reverse roller 74 causes the distal end of the recording material P to come out of the discharge port 75, and after the rear end of the recording material P has passed the fixing nip portion of the fixing portion 70, the discharge/reverse roller 74 rotates reversely, with the recording material P being held in a discharge nip portion formed by the discharge/reverse roller 74. The recording material P is transported in the opposite direction from the discharge direction by the reversely rotating discharge/reverse roller 74, following a double-side transfer path R2 formed by a double-side transfer guide provided to a backside door and a guide provided to the image forming portion 60. After that, the recording material P is transported again to the image forming portion 60, where transfer and fixing take place similarly to the process of single-sided printing on the opposite side from the printed side, after which the recording material P is discharged.

In this embodiment, in order to configure the apparatus to be operated by the user from the front, the recording material P is discharged from the discharge port 75 provided at the back of the apparatus onto a paper receiving portion 19*a* of a paper receiving tray 19 provided at the front of the apparatus. Namely, the discharge direction of recording material coincides with the front and back direction of the apparatus in this embodiment, the downstream and upstream of the discharge direction respectively corresponding to the front and rear. The image forming apparatus 100 of this embodiment is configured to allow the user who operates the apparatus from the front to readily collect the recording material P, since the recording material P is discharged from the discharge port 75 at the back of the apparatus and piled up on the paper receiving portion 19*a* located at the front of the apparatus and lower than the discharge port 75.

2. Outer Appearance of Image Forming Apparatus 100

Figure 2A:
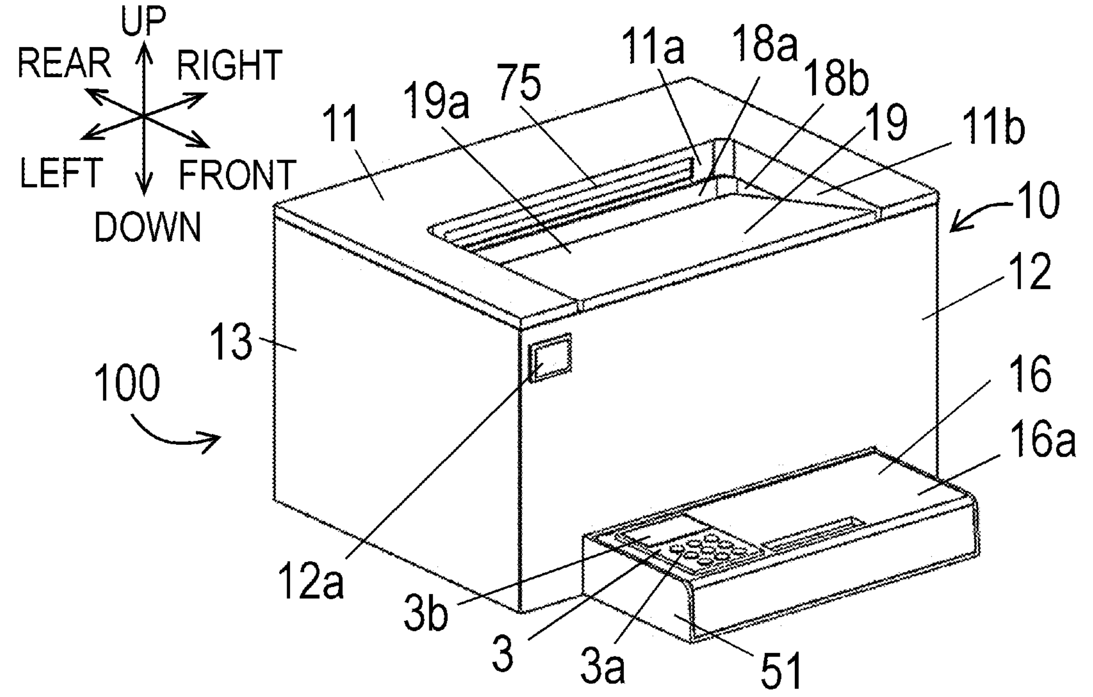
FIG. 2A and FIG. 2B are perspective views of the image forming apparatus according to the first embodiment.
Figure 2B:
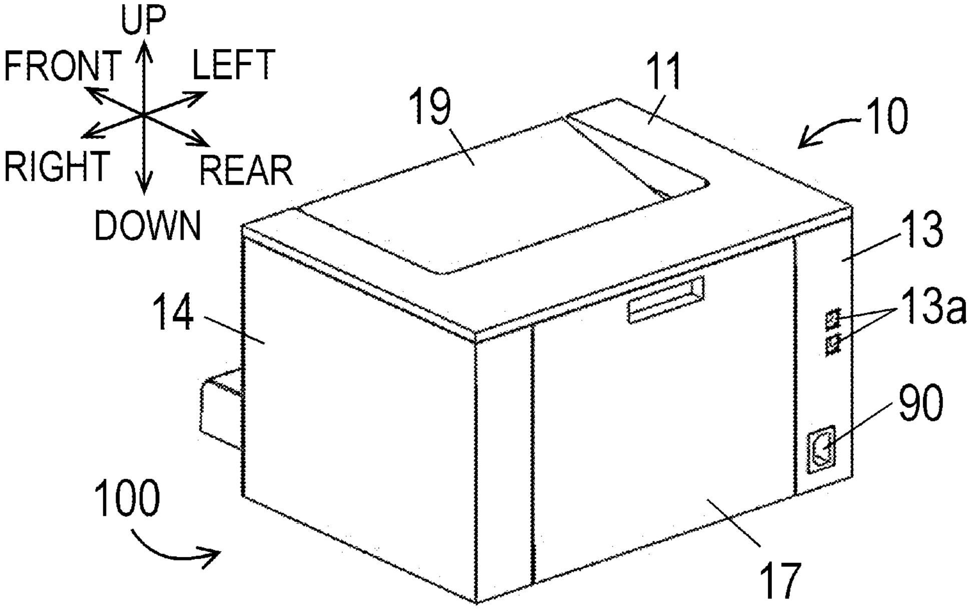

Next, the components that make up the outer appearance of the image forming apparatus 100 are described. FIG. 2A is a perspective view of the image forming apparatus 100 according to this embodiment viewed from the front of the apparatus, and FIG. 2B is a perspective view of the image forming apparatus 100 according to this embodiment viewed from the back of the apparatus. The image forming apparatus 100 is covered by a cover 10 composed of a plurality of resin members. In this embodiment, the cover 10 serving as the housing is formed by an upper cover (top cover) 11, a left cover (side cover) 13, a right cover 14, a front cover 12, a cassette cover 16, a backside door 17, an inner cover 18, and the paper receiving tray 19. The upper cover 11 covers at least part of the top of the apparatus. Printed recording material passes through the discharge port 75 that is covered by an inner front wall 11*a* of the upper cover 11 and an upright wall 18*a* of the inner cover 18, and piles up on the paper receiving portion 19*a* of the paper receiving tray 19. The upper cover 11 is located above the inner cover 18, the inner front wall 11*a* and the upright wall 18*a* being disposed continuously in the up and down direction (vertical direction). On both sides in the left and right direction of the paper receiving portion 19*a* stand inner side walls 11*b* of the upper cover 11 and side walls 18*b* of the inner cover 18.

The cassette cover 16 located on the front side of the image forming apparatus 100 is provided with an operation instruction portion 3, which is an operation portion, on the upper surface 16*a* thereof, including buttons 3*a* for the user to input printer operation instructions and a monitor 3*b* that displays the operating status of the apparatus.

The front cover 12 is provided with a disposables-related display 12*a*, which is a display screen visibly indicating predetermined information on conditions of disposables. The disposables-related display 12*a* is located near the upper end of the front cover 12 more to the left than the paper receiving tray 19 for the user to see the display with good visibility.

In this embodiment, the operation instruction portion 3 and disposables-related display 12*a* are provided on the front side of the apparatus for the configuration of the apparatus that allows the user to operate the apparatus from the front. Namely, displayed letters or characters and buttons are arranged on the precondition that the user operates the operation instruction portion 3 from the front of the apparatus. The front of the apparatus is covered by the front cover 12 and cassette cover 16.

The left cover 13 covers the left side of the image forming apparatus 100, and includes, at the back of the apparatus, an external connector portion 13*a* that allows connection of external communication lines such as USB or wireless LAN, and an inlet portion 90, or a power supply connector portion, for allowing power supply from outside. While the external connector portion 13*a* of this embodiment includes a USB connector and a LAN connector, it may have other types of connectors. The right cover 14 covers the right side of the image forming apparatus 100.

The backside door 17 is supported such that it can be opened and closed relative to the image forming apparatus 100, to allow clearance of jammed paper. The apparatus may be configured to allow replacement of disposable units or replenishment of disposables through the backside door 17. The cover 10 may be made up of more components, or may be an integrally formed one-piece component.

3. Opening and Closing of Cover 10

Figure 3A:
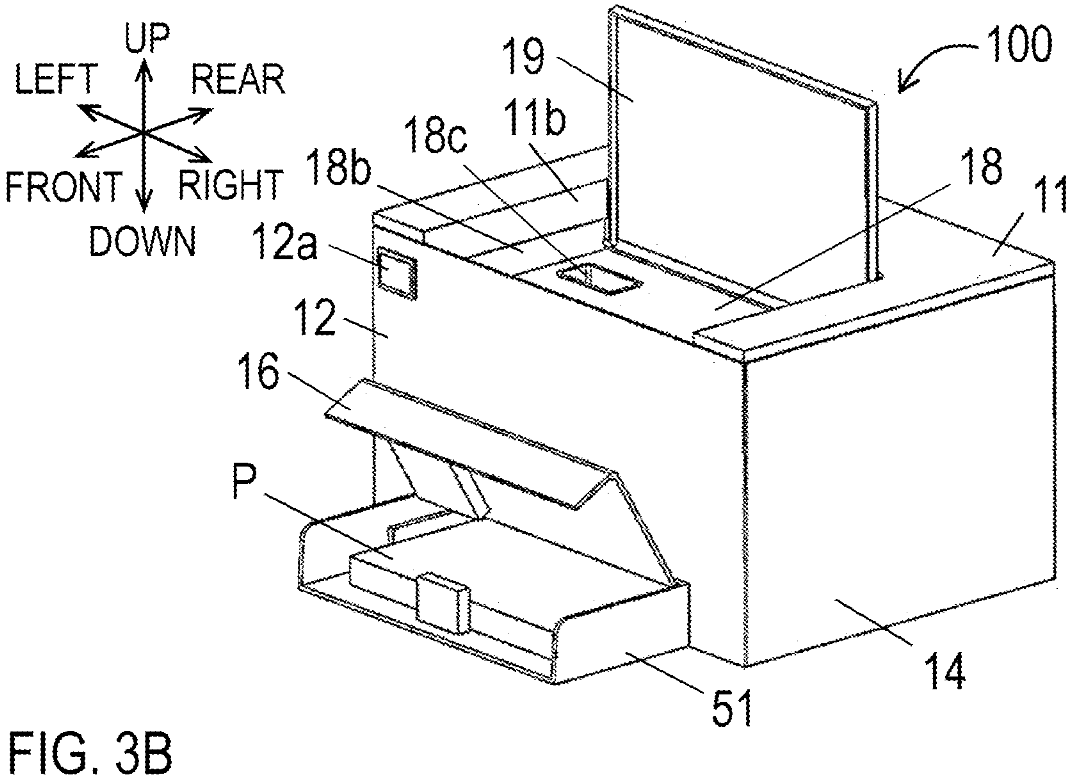
FIG. 3A and FIG. 3B are a perspective view and a front view of hinged members according to the first embodiment in an open state.
Figure 3B:
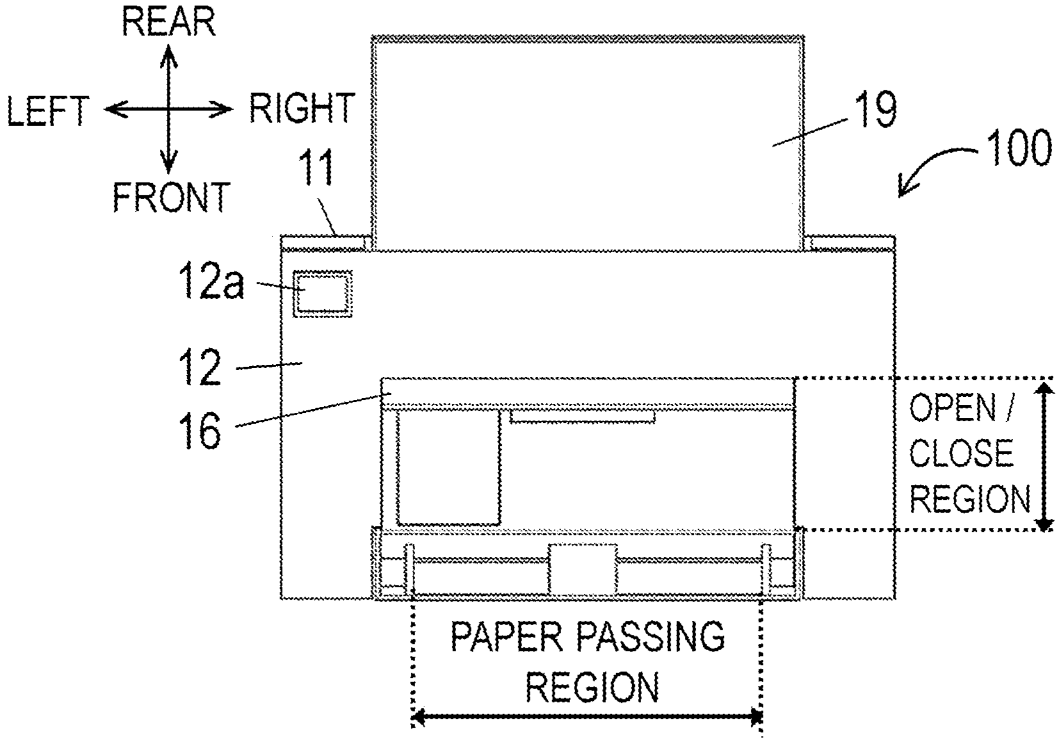

Next, the paper receiving tray 19 of the cover 10 and the cassette cover 16, which can both be opened and closed, are described. FIG. 3A is a perspective view of the image forming apparatus 100 according to the first embodiment, with the paper receiving tray 19 and cassette cover 16 being in the open position, as viewed from the front of the apparatus. FIG. 3B is a front view of the image forming apparatus 100 according to the first embodiment, with the paper receiving tray 19 and cassette cover 16 being in the open position, as viewed from the front of the apparatus.

The paper receiving tray 19 is supported such that it can be opened and closed relative to the main body of the image forming apparatus, so that the user can open the paper receiving tray 19 to feed disposables such as toner from a feed port 18*c* provided to the inner cover 18. The inner cover 18 has the feed port 18*c* located more to the left, closer to the disposables-related display 12*a* described above. Namely, the disposables-related display 12*a* and the feed port 18*c* are positioned close to each other to make it easier for the user to feed disposables into the feed port 18*c* while checking the disposables-related display 12*a*. While the inner cover 18 in this embodiment is fixed to the image forming apparatus 100, the inner cover 18 may be configured such that it can be opened and closed, so that disposables such as a toner cartridge can be replaced, with the paper receiving tray 19 and inner cover 18 being both opened.

The cassette cover 16 is supported such that it can be opened and closed relative to the main body of the image forming apparatus, to allow replenishment or replacement of the recording material P. The feeder cassette 51 is supported such that it can be inserted into and extracted from the main body of the image forming apparatus. For replacement or replenishment of the recording material P, the user can also pull out the feeder cassette 51 from the image forming apparatus 100 separately from the cassette cover 16. In this embodiment, in order to configure the apparatus to be operated by the user from the front of the apparatus, the feeder cassette 51 is designed such that it can be pulled out to the front of the apparatus. Namely, the direction in which the feeder cassette 51 is inserted and extracted coincides with the front and back direction of the apparatus in this embodiment, the downstream in the pulling-out direction of the feeder cassette 51 corresponding to the front of the apparatus.

Printing instructions can be given to the image forming apparatus without the use of the operation instruction portion 3, via communication through cables at the back, or wireless communication. Therefore, printing is possible even when the cassette cover 16, with the operation instruction portion 3 being installed on the upper surface 16*a* thereof, being open so that the operation instruction portion 3 is not readily visible for the user. The disposables-related display 12*a*, as shown in FIG. 3B, is located such that when the cassette cover 16 is opened, the cassette cover does not overlap the display, as viewed from the front. This layout makes it possible to prompt the user to add or replace disposables with reference to the disposables-related display 12*a*, when disposables are near exhaustion, for example, even when the user has been printing with the cassette cover 16 left open. Cassette covers are generally larger than an entire paper passing region. Therefore, the disposables-related display 12*a* may be disposed on the front cover 12 outside of the paper passing region in the left and right direction to minimize overlapping. As regards the up and down direction, too, as shown in FIG. 3B, the image forming apparatus 100 is configured such that the upper end of an open/close region, where the cassette cover 16 passes when opened and closed, is positioned lower than the disposables-related display 12*a*. The open/close region can be set such as to avoid overlapping of the cassette cover 16 by making the maximum open angle of the cassette cover 16 smaller, or by making the length of the cassette cover 16 and the feeder cassette 51 in the front and back direction shorter.

4. Configuration of Frame 20

Figure 4A:
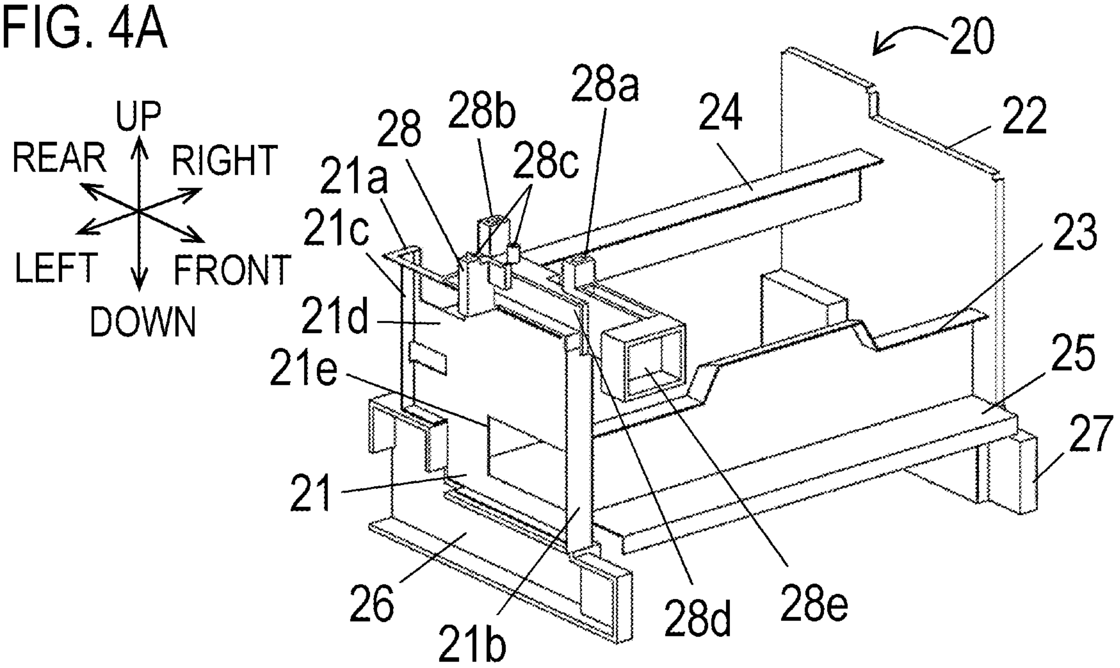
FIG. 4A and FIG. 4B are a perspective view and a left side view illustrating a frame and a support member according to the first embodiment.
Figure 4B:
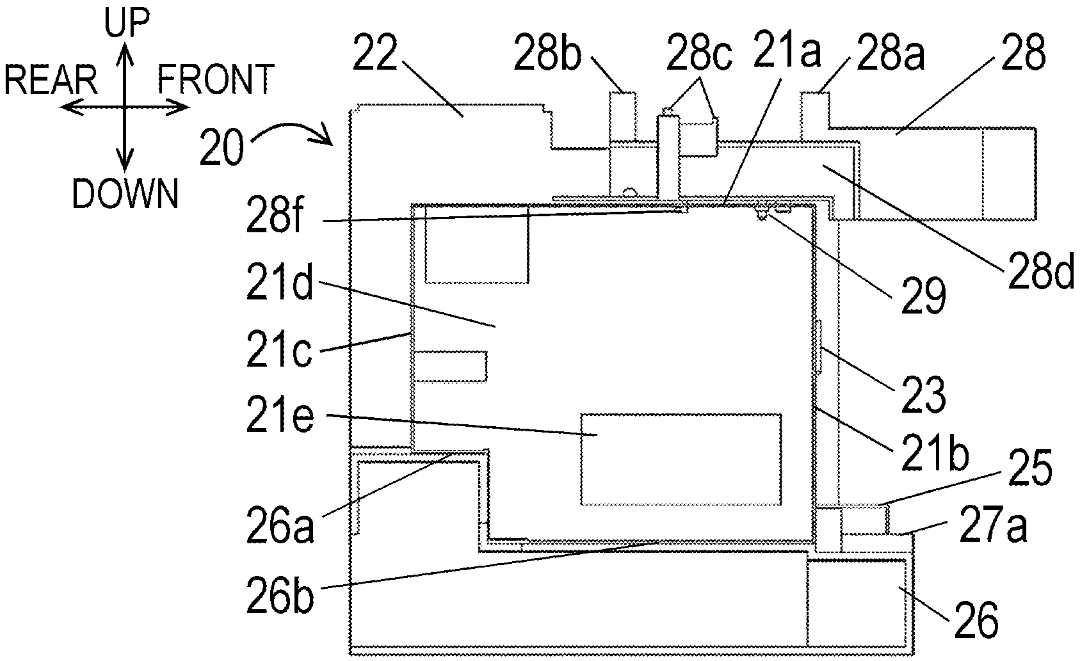

Next, the frame 20 that supports the image forming portion 60 and fixing portion 70, and its peripheral components are described. FIG. 4A is a perspective view illustrating the frame 20 according to this embodiment, and FIG. 4B is a left side view illustrating the frame 20 according to this embodiment.

Frame 20

The frame 20 includes a left frame (first metal side plate) 21 and a right frame (second metal side plate) 22 that are a pair of upright side plates opposite each other. The frame 20 further includes a front frame 23, a rear frame 24, and a lower frame 25 disposed between the left frame 21 and the right frame 22. The front frame 23, rear frame 24, and lower frame 25 extend in a direction orthogonal to the surfaces of the left frame 21 and right frame 22 and connect the left frame 21 and right frame 22. These frames are fixed with screws or by welding or swaging, and also electrically connected to each other. The left frame 21 and right frame 22 extend horizontally along an extension direction coinciding with the front and back direction of the apparatus and opposite each other on both sides of the image forming portion where images are formed, and the discharge port 75 for discharging the recording material P to the outside. The recording material P is discharged from one end (rear end) toward the other end (front end) of the image forming apparatus along the extension direction of the left frame 21.

The frame 20 further includes a lower left frame 26 and a lower right frame 27. The lower left frame 26 is positioned lower than the left frame 21 and supports the left frame 21 at a plurality of support points 26*a* and 26*b*. The lower right frame 27 is positioned lower than the right frame 22. The lower right frame supports the right frame 22 at a support point that is not shown, and supports the lower frame 25 at a support point 27*a* located more to the front than the right frame and its support point. The left frame 21 is provided with an opening 21*e* in its main flat surface portion for cables and the like for electrical connection to extend through across the left frame 21. The lower left frame 26 and lower right frame 27 protrude forward beyond other frame portions made of metal, to allow components that are preferably distanced from metal to be disposed more to the front, while maintaining the apparatus rigidity. In this embodiment, the upper end of the left frame 21 is positioned lower than the upper end of the right frame 22.

Support Member 28

The support member 28 is a structure fixed to the left frame 21 and providing the function of supporting various components such as a wireless communication substrate and housing, and the function of maintaining the rigidity of the image forming apparatus 100. The support member 28 includes a front support portion 28*a* and a rear support portion 28*b* that support the upper cover 11, a substrate support portion 28*c* that supports a control substrate unit 30 to be described later, and a wire bundle holding portion 28*d* that holds bundled wires. The support member 28 further includes a display screen support portion 28*e* that supports the disposables-related display 12*a*. The support member 28 also has a hook 28*f* that engages with the upper surface 21*a* of the left frame 21, and is fixed to the upper surface 21*a* of the left frame 21 by the hook 28*f* and a screw 29. The left frame 21 has a front surface 21*b* and a rear surface 21*c* extending along the up and down direction so that it has a square U-shaped cross section when viewed from above, and therefore has sufficient rigidity against the load in the up and down direction. Namely, when an external force is applied from above to the image forming apparatus, the left frame receives the force transmitted from the support member 28 particularly on the flat surface 21*d* and the front surface 21*b*, and thus can help maintain the rigidity in the up and down direction. The configuration of the support member 28 supporting the wireless communication substrate and housing, which is a characteristic feature of the present invention, will be described in more detail later.

The configurations of the frame and support member described herein should not be construed as limiting. Various changes can be made and the effects of the present invention can still be achieved. For example, the frame may be made up of more components, or may be an integrally formed one-piece component.

5. Internal Structure of Image Forming Apparatus 100

Figure 5:
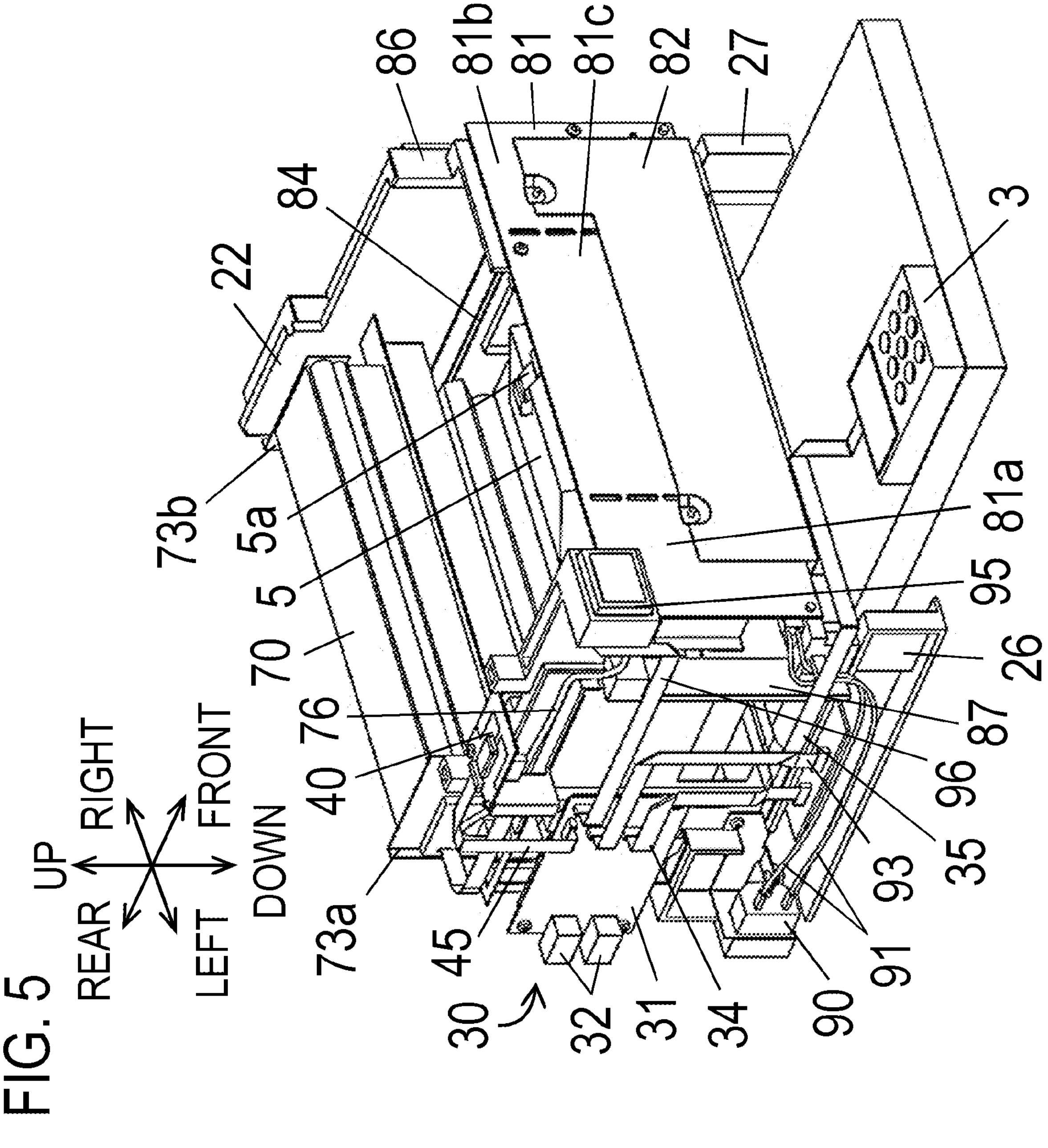
FIG. 5 is a perspective view illustrating an internal configuration of the image forming apparatus according to the first embodiment.
Figure 6:
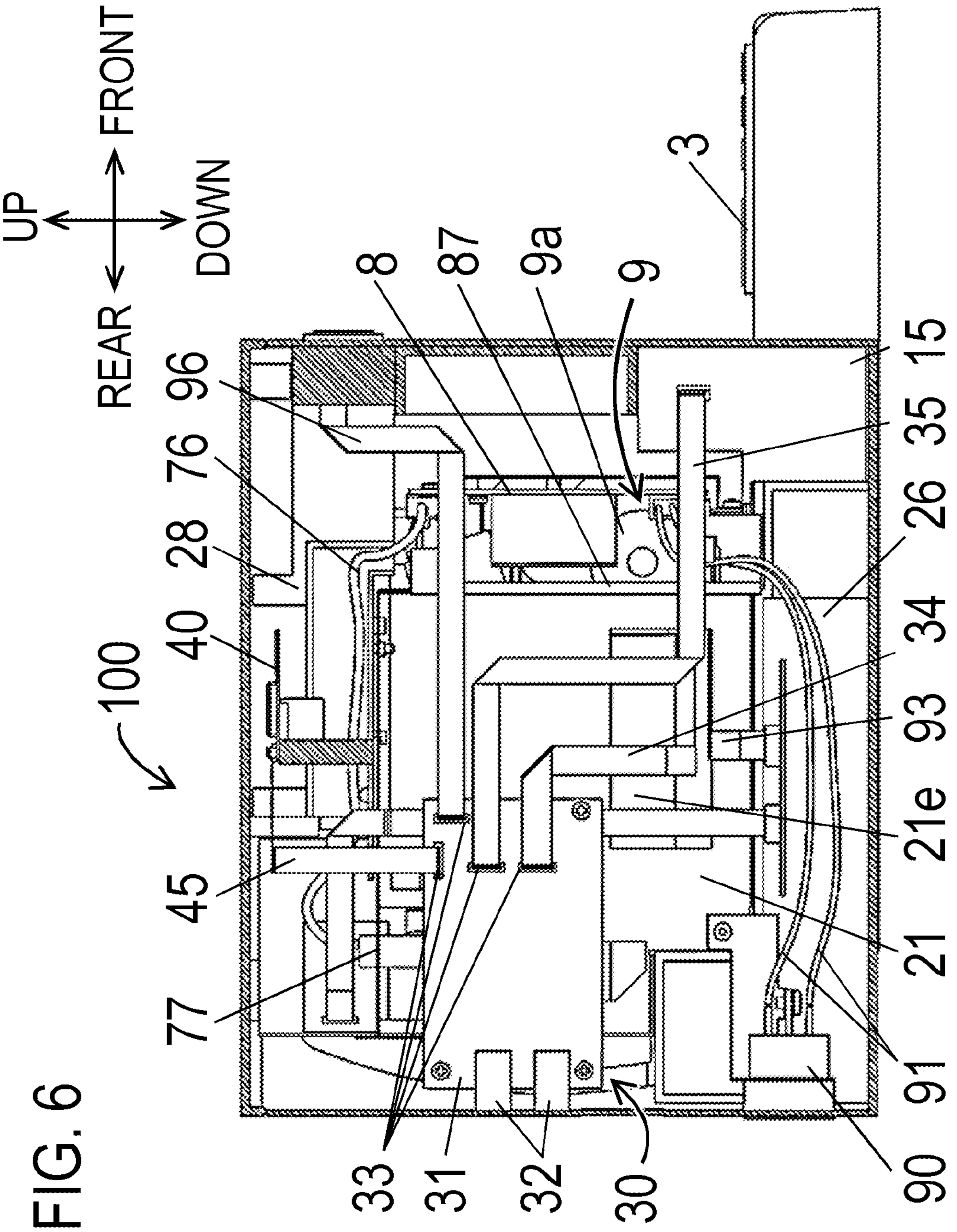
FIG. 6 is a cross-sectional view illustrating the internal configuration of the image forming apparatus according to the first embodiment.

Next, an internal structure of the image forming apparatus 100 is described. FIG. 5 is a perspective view of the image forming apparatus 100 according to this embodiment where the cover 10 is not shown. FIG. 6 is a cross-sectional view of the image forming apparatus 100 according to this embodiment viewed from the left. The image forming apparatus 100 includes a control substrate unit 30 for operation control of the image forming apparatus 100, and a wireless LAN module 40, which is a wireless communication substrate that receives predetermined printing and setting instructions from external equipment via wireless LAN communication. The control substrate unit 30 and wireless LAN module 40 will be described in detail later.

Laser Scanner 5

The laser scanner 5 for forming latent images is provided between the left frame 21 and the right frame 22 of the frame 20. The laser scanner 5 according to this embodiment is positioned lower than the upper end of the right frame 22 and the wireless LAN module 40. This positional relationship can reduce the influence of noise from the laser scanner 5 on wireless communication.

Drive Unit 9

To the right frame 22 is attached the drive unit 9 with the motor 9*a* for driving moving components such as rollers of the image forming apparatus 100. The motor 9*a* is disposed lower than the wireless LAN module 40, on the opposite side from the wireless LAN module 40 across the right frame 22. This positional relationship can reduce the influence of noise from the drive unit 9, in particular the motor 9*a*, on wireless communication.

Electrical Unit 8

The electrical unit 8, which has multiple functions such as voltage conversion and signal/electricity supply to various portions, is provided in the front of the image forming apparatus 100 closer to the front frame 23 than to the rear frame 24 in the front and back direction. The electrical unit 8 is primarily made up of a substrate 81, a sheet metal substrate support 82, and electrical devices and connectors that are not shown. The electrical unit 8 has control functions and voltage conversion functions. The circuits provided on the substrate can be roughly classified by voltage into a primary voltage portion 81*a* with the same level of voltage as outside, a secondary high voltage portion 81*b* with a higher voltage than outside, and a secondary low voltage portion 81*c* with a lower voltage than outside. The substrate 81 is supported by the sheet metal substrate support 82, a right support member 86, and a left support member 87. The sheet metal substrate support 82 is fixed to the lower frame 25, the right support member 86 is fixed to the right frame 22, and the left support member 87 is fixed to the left frame 21. Thus the substrate 81 can be disposed at a certain distance from the front frame 23, left frame 21, and right frame 22 that are made of metal, so that accidental leaks can be prevented.

The electrical unit 8 receives electricity supplied from outside as primary voltage via the inlet portion 90 and cable 91, which is converted inside the electrical unit into a secondary low voltage current and a secondary high voltage current. The primary voltage current and secondary voltage current are then supplied to various parts in the image forming apparatus 100 to execute various control activities.

The electrical connection between the electrical unit 8 and various portions is described in more specific terms. The primary voltage portion 81*a* and the heating portion of the fixing portion 70 are connected via a primary power supply, a cable 76, and a connector 77 provided to the fixing unit, to supply electricity for the fixing and heating. The primary voltage portion 81*a* and connector 77 are provided on the left side in the left and right direction of the main body. Since they are located close to each other, the cable 91 and cable 76 can be made as short as possible even though the electrical unit 8 is disposed more forward than the frame 20, which leads to a lower cost, less noise, and better wireless communication performance. The cable 76 is supported by the support member 28 that is made of resin, while the cable 91 is supported by the lower left frame 26 that is made of resin. Since they are both kept at a certain distance from the left frame 21 that is made of metal, accidental leaks can be prevented.

The secondary low voltage portion 81*c* is connected to the laser scanner 5 by a cable 5*a*, and to the control substrate unit 30 by a flexible flat cable (hereinafter, FFC) 34 that passes through the opening 21*e* in the left frame 21. The secondary low voltage portion 81*c* is connected to other sensors (not shown) by an FFC 93 and a cable (not shown) that pass through the opening 21*e* in the left frame 21. The secondary low voltage portion 81*c* is further connected to a sensor portion (not shown) of the fixing unit by an FFC (not shown). The motor 9*a* of the drive unit 9 and other sensors are connected to cables (not shown). The secondary low voltage portion 81*c* is disposed opposite the laser scanner 5 and motor 9*a* so that the cable 5*a* and motor cable (not shown) can be made as short as possible. This configuration can contribute to reduce the costs of the image forming apparatus, lower the noise, and improve the wireless communication performance.

The secondary high voltage portion 81*b* is connected to the image forming portion 60 and disposable units by a conductive metal wire 84. The metal wire 84 is mostly positioned within the region between the left frame 21 and the right frame 22 and on the right side in the left and right direction of the image forming apparatus 100 close to the right frame 22. Namely, the metal wire 84 is positioned away from the wireless LAN module 40 and control substrate unit 30 that are disposed close to the left frame 21, which helps realize noise reduction in the image forming apparatus and improve wireless communication performance.

Control Substrate Unit 30

The control substrate unit 30 is primarily made up of a substrate 31, devices and circuits that are not shown, an external connection connector 32, and a plurality of internal connection connectors 33. The control substrate unit 30 is supported by the substrate 31 being fixed to the frame 20 that is the chassis of the image forming apparatus 100. The substrate 31 may be directly attached to the left frame 21, or may have a metal sheet attachment piece between itself and the left frame 21. Noise stability can be improved by disposing the control substrate unit 30 such as to overlap the left frame 21 that is made of metal.

The control substrate unit 30 is connected to the electrical unit 8 by the FFC 34, connected to the wireless LAN module 40 by an FFC 45, connected to the operation instruction portion 3 by an FFC 35, and connected to a disposables-related display unit 95 by an FFC 96. When the user inputs an instruction through the external connection connector 32 or wireless LAN module 40 or from the operation instruction portion 3, the input signal is processed at the control substrate unit 30 such that the electrical unit 8 causes the image forming apparatus 100 to execute the operation instructed by the user. When jamming or other abnormalities are detected by the sensors of the image forming apparatus 100, the signal information is transmitted via the electrical unit 8 from the interior of the image forming apparatus 100 to the control substrate unit 30, conversely from the above-described process. This signal information can then be reported to the user through the external connection connector 32 or wireless LAN module 40 or by the operation instruction portion 3.

6. Configuration and Position of Wireless LAN Module 40

Figure 7A:
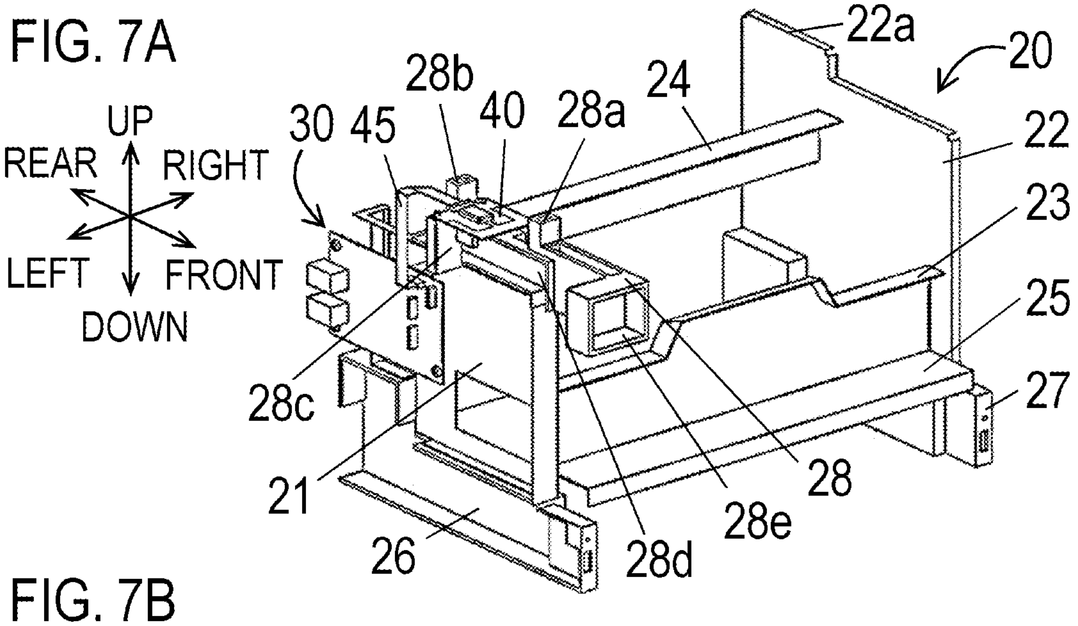
FIG. 7A to FIG. 7C are diagrams illustrating a wireless communication substrate and peripheral components according to the first embodiment.
Figure 7B:
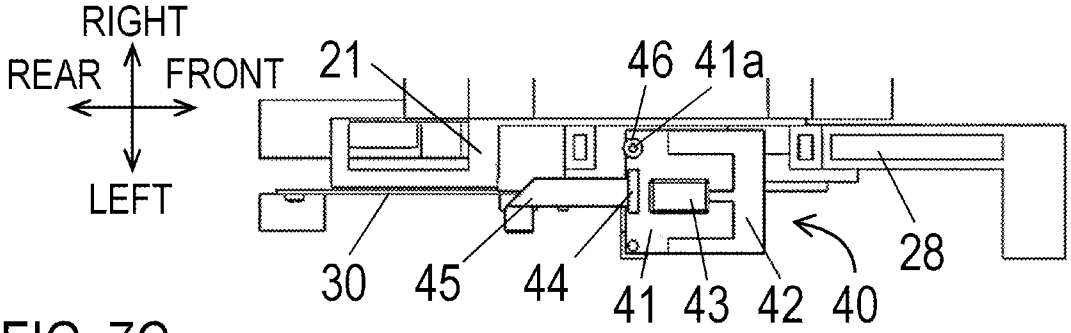
Figure 7C:
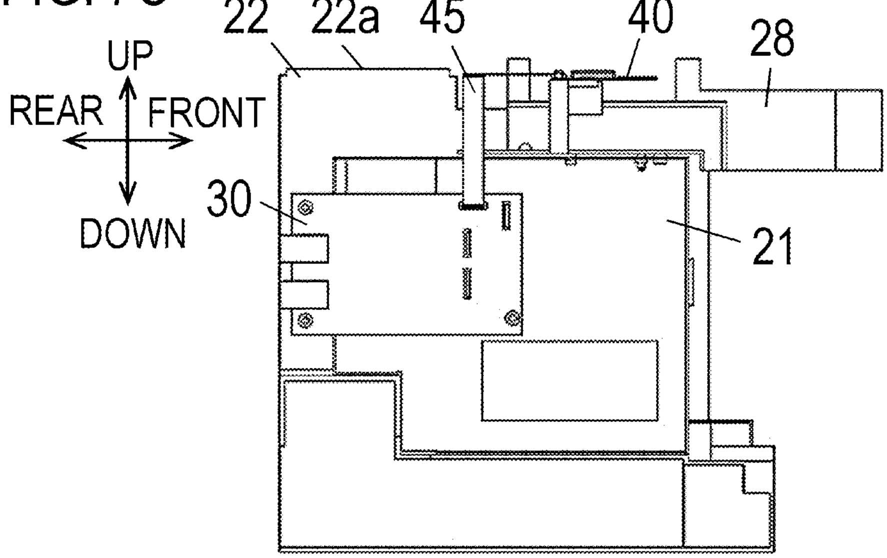

Next, the position and the method of supporting the wireless LAN module 40, which are a characteristic feature of the present invention, are described. FIG. 7A is a perspective view illustrating the wireless LAN module 40, frame 20, and control substrate unit 30 according to this embodiment, FIG. 7B is a top plan view thereof, and FIG. 7C is a left side view thereof.

Wireless LAN Module 40

The wireless LAN module 40, or a wireless communication substrate, includes a substrate 41, an antenna 42 provided on the substrate 41, a wireless communication module 43, and a connector 44. The substrate 41 includes devices and circuits that are not shown, and a mounting portion 41*a* that allows the wireless LAN module 40 to be attached to the apparatus. The wireless LAN module 40 can receive predetermined printing or setting instructions from external equipment, with the antenna 42 receiving wireless signals, and the wireless communication module 43, devices and circuits processing the signals. The instructions received by the wireless LAN module 40 are transmitted to the control substrate unit 30 via the FFC 45 connected to the connector 44. This means that it is particularly important to dispose the antenna 42 that receives wireless signals at a position where the wireless communication performance will not be compromised, and such as to be protected in a sturdy manner.

The support member 28, which is a characteristic feature of the present invention, has the substrate support portion 28*c* that is an antenna support portion. The configuration in which the substrate support portion 28*c* supports the wireless LAN module 40 is described. The wireless LAN module 40 having the antenna 42 is stably supported on the support member 28 with a screw 46 fastened thereto, the substrate 41 being supported at various parts by the substrate support portion 28*c* of the support member 28. The support member 28 is provided on the left frame 21 (metal side plate) and positioned higher than the upper surface 21*a* that is the upper end of the left frame 21, so that the wireless LAN module 40 is positioned higher than the upper surface 21*a* of the left frame 21. The upper surface 22*a* that is the upper end of the right frame 22, on the other hand, is positioned higher than the wireless LAN module 40. However, the right frame 22 and the wireless LAN module 40 are positioned on the opposite ends in the left and right direction inside the apparatus and spaced away from each other, so that the right frame 22 affects the wireless communication performance less than the left frame 21. In this embodiment, the left frame 21 is positioned lower than the wireless LAN module 40, and the operation instruction portion 3, which is the user access portion, the external connector, and the inlet are disposed on the left side in the image forming apparatus. With this configuration, the orientation of the image forming apparatus that provides good operability matches the orientation that provides good wireless communication performance, and therefore the image forming apparatus is user friendly. Thus the present invention is applied particularly effectively.

Mid range wireless LAN communications such as Wi-Fi, which is the mainstream wireless communication means of the recent years, use frequency bands that are more susceptible to the influence of obstacles (e.g., 2.4 GHz or 5 GHz) than those of near range wireless communications such as NFC, and the positions of transmission destinations are not constant. The above-described layout secures good wireless communication performance by preventing degradation of the communication performance of the wireless LAN module 40 caused by the metal frame 20. The wireless LAN module 40 is disposed such that the substrate 41 surface is oriented toward the vertical direction. The module therefore does not need a large space in the up and down direction and does not take up an unnecessarily large height. This configuration therefore does not demand an increase in apparatus size.

The wireless LAN module 40 is positioned at the back of and above the electrical unit 8, above the cable 76 and cable 91, in front of and above the control substrate unit 30, above the laser scanner 5, and at the back of the disposables-related display 12*a*. These positional relationships each contribute to noise reduction and better wireless communication performance of the image forming apparatus.

7. Positional Relationship Between Wireless LAN Module 40 and Upper Cover 11

Figure 8:
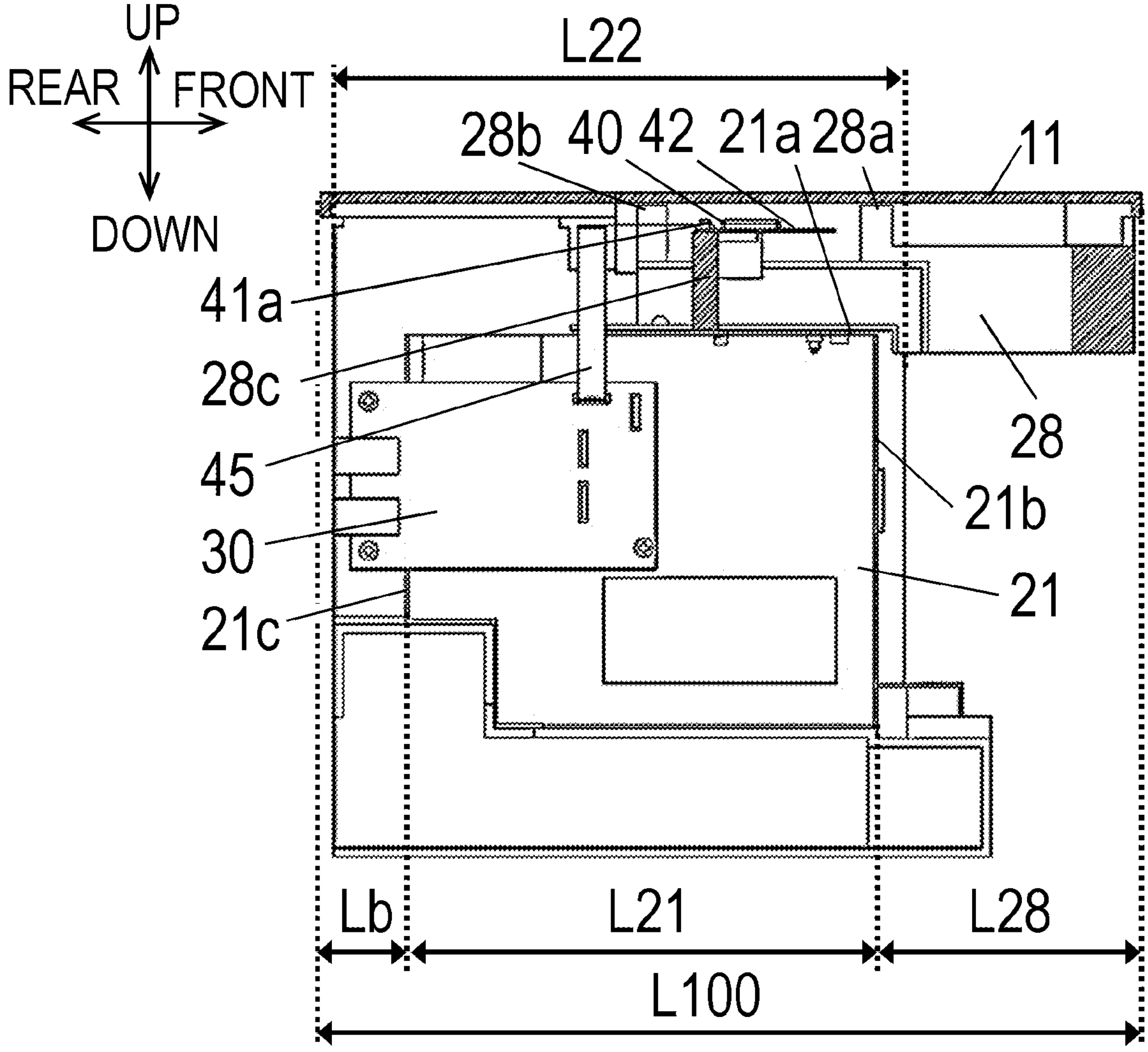
FIG. 8 is a cross-sectional view illustrating the wireless communication substrate and peripheral components according to the first embodiment.

Next, the positional relationship between the wireless LAN module 40 and the upper cover 11 is described in more detail. FIG. 8 is a cross-sectional view of the frame 20, upper cover 11, wireless LAN module 40, and control substrate unit 30 according to the first embodiment, viewed from the left.

The support member 28 supports the upper cover 11 with the front support portion 28*a* and rear support portion 28*b* that serve as housing support portions. The support member 28 may keep the upper cover 11 in fixed position, or may be configured separable therefrom, with a small gap therebetween, so that when the upper cover 11 is pressed from above and flexes, the respective support portions of the support member 28 make contact with and support the upper cover 11. In either configuration, the front support portion 28*a* and rear support portion 28*b* stably keep the support member 28 and upper cover 11 at their positions relative to each other. The wireless LAN module 40 is fixed to the support member 28 as described above. Namely, the wireless LAN module 40 and upper cover 11 are stably kept at their positions relative to each other similarly to the relationship between the support member 28 and the upper cover 11. The wireless LAN module 40 is further supported by the substrate support portion 28*c* that is positioned between the front support portion 28*a* and the rear support portion 28*b* in the front and back direction. Namely, the support member 28 has the substrate support portion 28*c* serving as the antenna support portion positioned between the front support portion 28*a* and the rear support portion 28*b* serving as housing support portions. This configuration ensures that the wireless LAN module 40 and the upper cover 11 are stably kept at a distance even when the upper cover 11 or the apparatus temporarily undergoes deformation by an external force.

The support member 28 is a relatively sturdy component among the parts of the image forming apparatus in order to support the upper cover 11. Therefore, any deformation, if any, in the support member when the entire apparatus is subjected to vibration or impact during transportation of the apparatus is lighter than that of common components, so that there is little risk of the upper cover 11 interfering with the wireless LAN module 40. Moreover, the shape of the support for the wireless LAN module 40 is relatively simple and offers a high degree of freedom, so that shapes that may become an obstacle for wireless communication can be avoided. Also, the support member 28 is producible at a relatively low cost. All these help significantly reduce the risk of collision between the wireless LAN module 40 supported by the support member 28 and the upper cover 11 even though they are positioned in proximity to each other. In other words, the wireless LAN module 40 can be disposed at the highest possible position in the image forming apparatus 100 without adding a component for this specific purpose.

Since the wireless LAN module 40 is disposed on the left side, the left frame 21 should preferably be as small and short as possible in order to minimize the influence of the metal frame on the communication performance. Accordingly, the left frame 21 has a length L21 in the front and back direction that is not greater than ⅔ of the length L100 in the front and back direction of the image forming apparatus, which is even shorter than the length L22 in the front and back direction of the right frame. Instead, the support member 28 located in the front of the apparatus has a length L28 in the front and back direction that is greater than the length Lb in the front and back direction of a region at the back of the left frame 21 in the image forming apparatus 100. Namely, the left frame 21 is disposed closer to the rear rather than at the center of the apparatus in the front and back direction. In other words, the left frame 21 is disposed closer to one end (rear end) than to the other end (front end) of the image forming apparatus 100 in the front and back direction, so that the left frame 21 has a smaller volume in the part positioned on the other side (front-end side) of the wireless LAN module 40. This layout minimizes the adverse effects on the communication performance caused by the left frame 21 that is a metal member, when external equipment wirelessly communicating with the wireless LAN module 40 is positioned in front of and vertically lower than the apparatus.

The cables, FFCs, and metal wires described above may be replaced with different types from those used herein, or other types of electrical wiring used for wired connection and capable of power supply. While wireless connection here presupposes Wi-Fi communication, the present invention can be applied also to other frequency bands and standards such as NFC or Bluetooth, if doing so will provide the effects of the invention. Instead of the connections using connectors as described above, cables may be directly connected to the substrate using solder or the like.

8. Relationship Between Cover 10 and Peripheral Components

Next, the configuration of the cover 10, which is the outer casing of the image forming apparatus 100, and the peripheral components that support the cover 10 are described in detail. As described above, the frame 20 is disposed closer to the rear rather than at the center of the apparatus. Even so, the image forming apparatus 100 of this embodiment is configured to have rigidity in the front of the apparatus without the frame 20, with the use of other members than the frame. This feature is described particularly in detail.

Figure 9A:
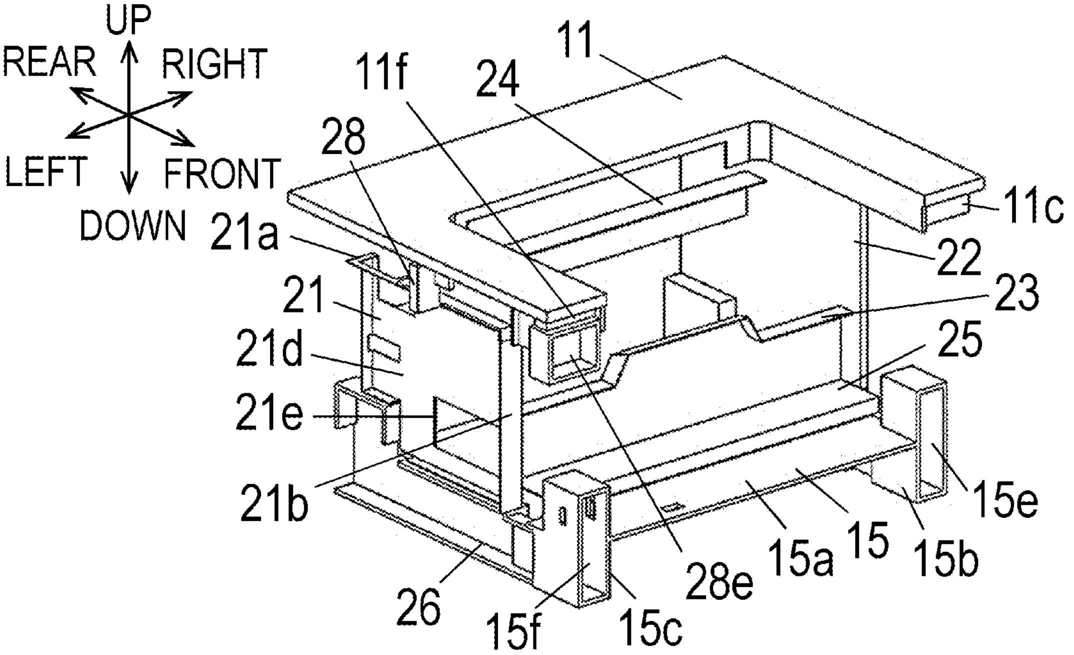
FIG. 9A to FIG. 9C are diagrams of the frame, support member, upper cover, and lower cover according to the first embodiment.
Figure 9B:
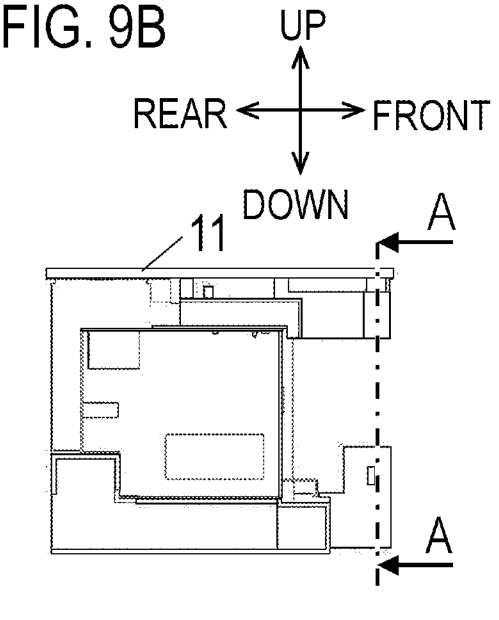
Figure 9C:
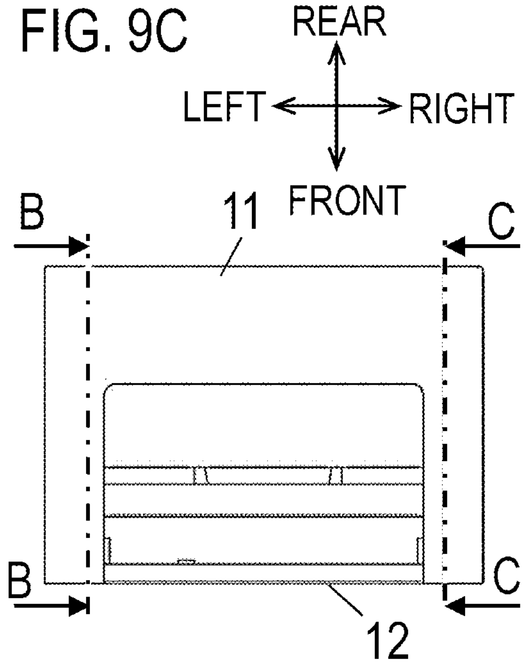
Figure 10A:
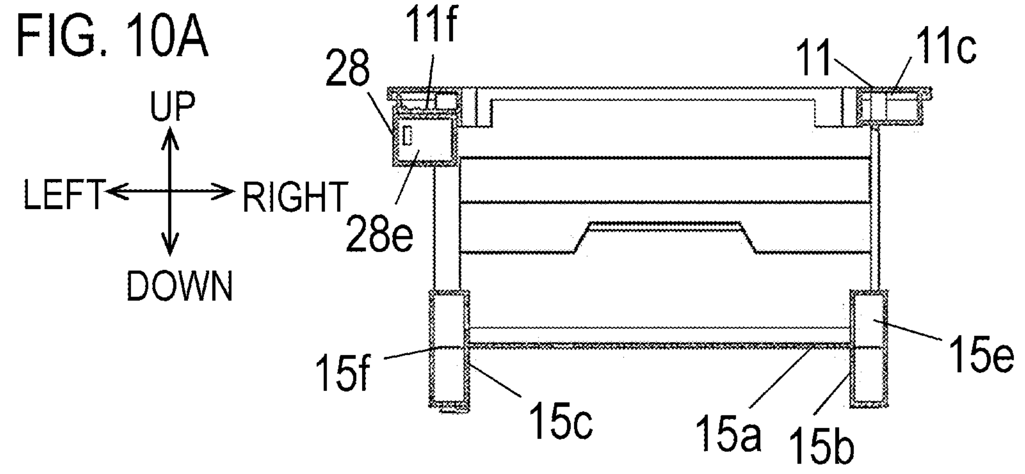
FIG. 10A to FIG. 10C are cross-sectional views illustrating the configuration that supports the upper cover according to the first embodiment.
Figure 10B:
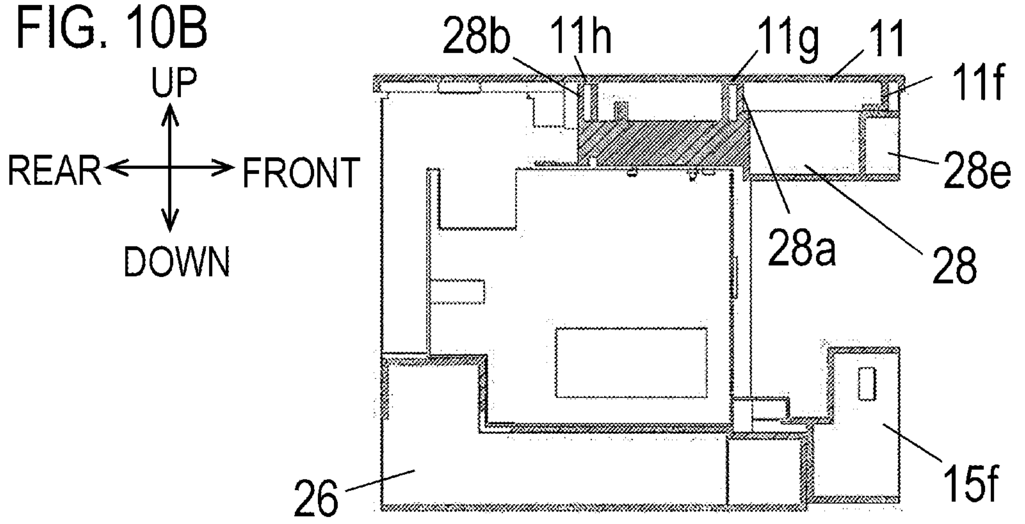
Figure 10C:
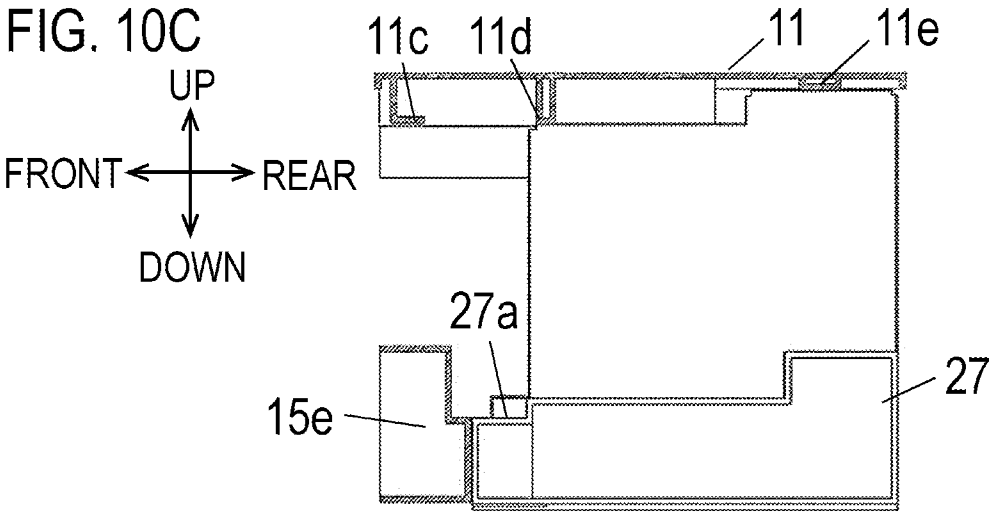
Figure 11:
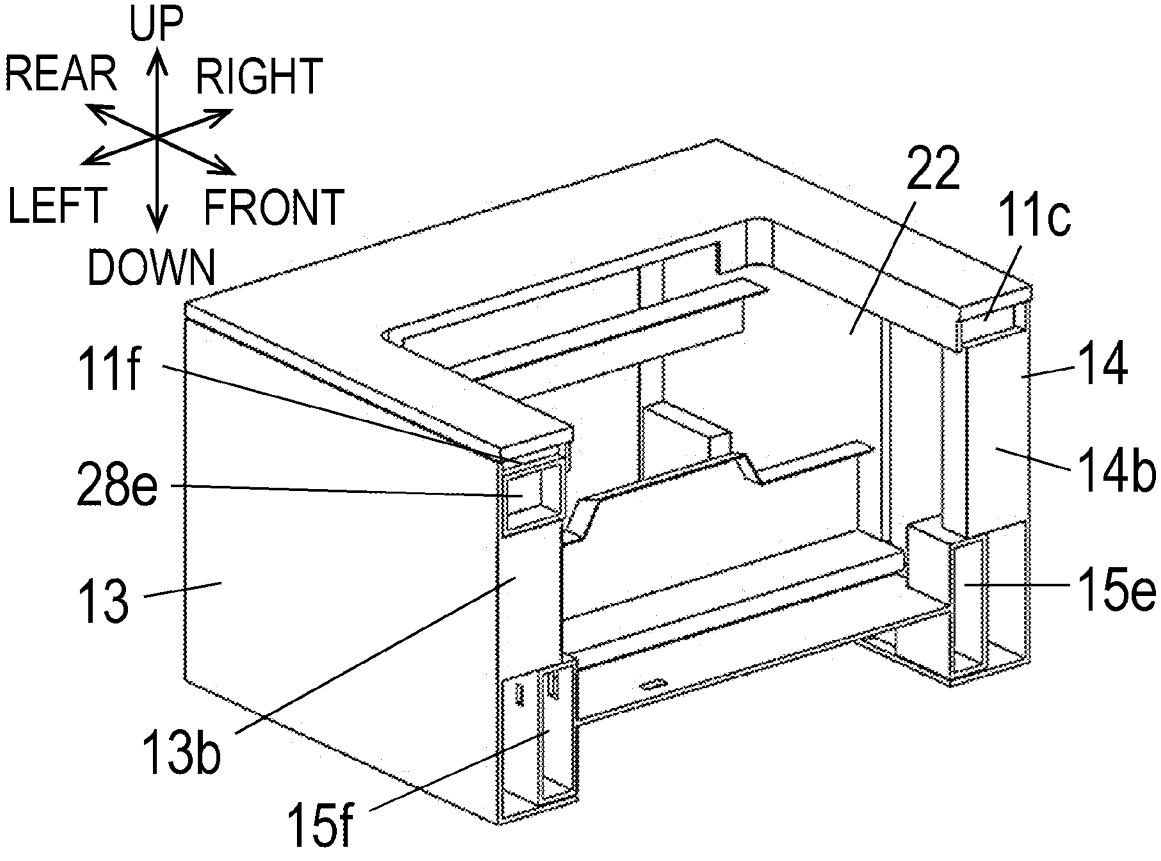
FIG. 11 is a perspective view illustrating the positional relationship between various covers according to the first embodiment.

First, the configuration that supports the upper cover 11 is described in detail. FIG. 9A is a perspective view illustrating the frame 20, support member 28, upper cover 11, and lower cover 15 according to this embodiment, FIG. 9B is a left side view thereof, and FIG. 9C is a top plan view thereof. FIG. 10A is an A-A cross section of FIG. 9B viewed from the front, FIG. 10B is a B-B cross section of FIG. 9C viewed from the left, and FIG. 10C is a C-C cross section of FIG. 9C viewed from the right. FIG. 11 is a perspective view illustrating the frame 20, support member 28, upper cover 11, right cover 14, left cover 13, and lower cover 15 according to this embodiment.

The upper cover 11 includes a right front support portion 11*c* in the right front, a right middle support portion 11*d* in the right middle, a right rear support portion 11*e* in the right rear, a left front support portion 11*f* in the left front, a left middle support portion 11*g* in the left middle, and a left rear support portion 11*h* in the left rear. These support portions each protrude downward from the lower surface of the upper cover 11. The right front support portion 11*c* is in contact with a support portion 14*b* of the right cover 14. The right middle support portion 11*d* is in contact with the top surface of the right frame 22 at a point in the front, and the right rear support portion 11*e* is in contact with the top surface of the right frame 22 at a point in the rear. The left front support portion 11*f* is in contact with a display screen support portion 28*e* of the support member 28, which supports the disposables-related display 12*a*. The left middle support portion 11*g* is in contact with the front support portion 28*a* of the support member 28, and the left rear support portion 11*h* is in contact with the rear support portion 28*b* of the support member 28. How these support portions provide support against external forces will be described in detail later.

In the lower front of the image forming apparatus 100 is provided the lower cover 15 that separates the interior and exterior of the apparatus when the feeder cassette 51 is attached to and removed from the main body of the apparatus. The lower cover 15 includes an upper wall 15*a*, a right wall 15*b*, and a left wall 15*c*. The lower cover 15 not only protects the interior of the apparatus, but also serves as a support member that supports other members, i.e., the right wall 15*b* serving as a right front support portion 15*e*, and the left wall 15*c* serving as a left front support portion 15*f*.

The right cover 14 includes a support portion 14*b* disposed between the right front support portion 11*c* of the upper cover 11 and the right front support portion 15*e* of the lower cover 15. The support portion 14*b* provided between and in contact with the right front support portion 11*c* and the right front support portion 15*e* can enhance the rigidity against external forces in the up and down direction in the right front of the apparatus. Similarly, the left cover 13 includes a support portion 13*b* disposed between the left front support portion 11*f* of the upper cover 11 and the left front support portion 15*f* of the lower cover 15. Moreover, in the left front of the apparatus, the display screen support portion 28*e* of the support member 28 is provided between the left front support portion 11*f* and the support portion 13*b*. Namely, in the left front of the apparatus, the left front support portion 11*f*, display screen support portion 28*e*, support portion 13*b*, and left front support portion 15*f* together enhance the rigidity against external forces in the up and down direction.

Figure 12:
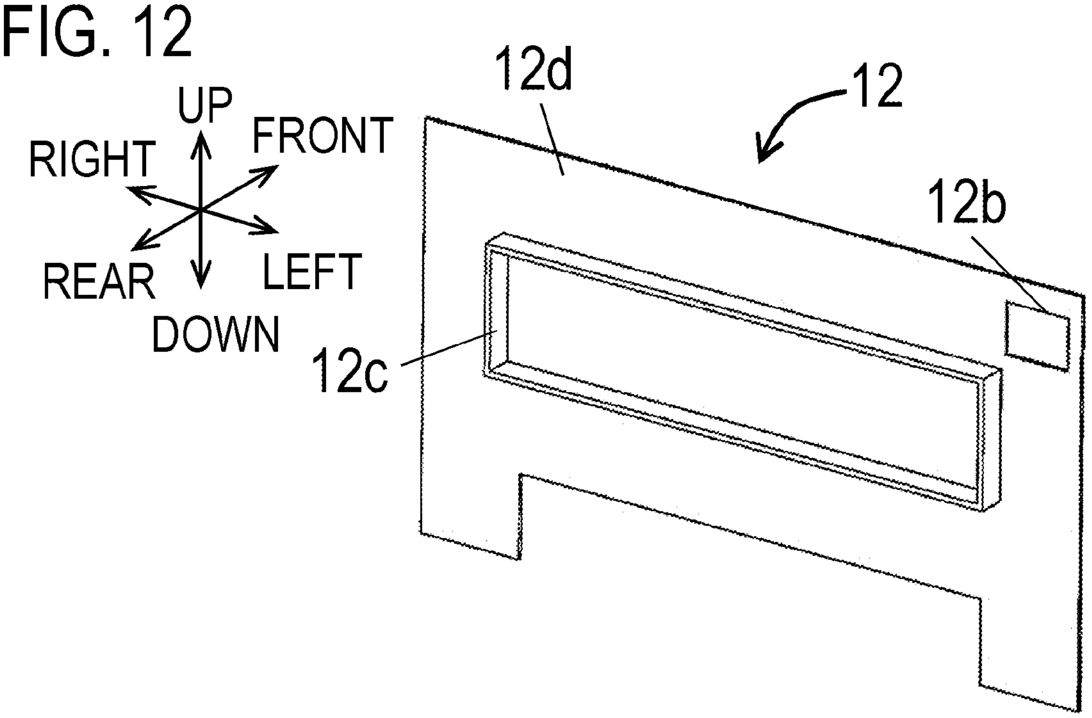
FIG. 12 is a perspective view of the front cover according to the first embodiment.

FIG. 12 is a perspective view of the front cover 12 according to this embodiment viewed from the back. The front cover 12 includes a display hole 12*b* for providing the disposables-related display 12*a*, and a support portion 12*c* for securing rigidity against external forces in combination with other members. While the support portion 12*c* in this embodiment is a frame-like protrusion projecting rearward from the inner surface 12*d* facing toward the back, the shape may be changed suitably in accordance with other members.

Figure 13A:
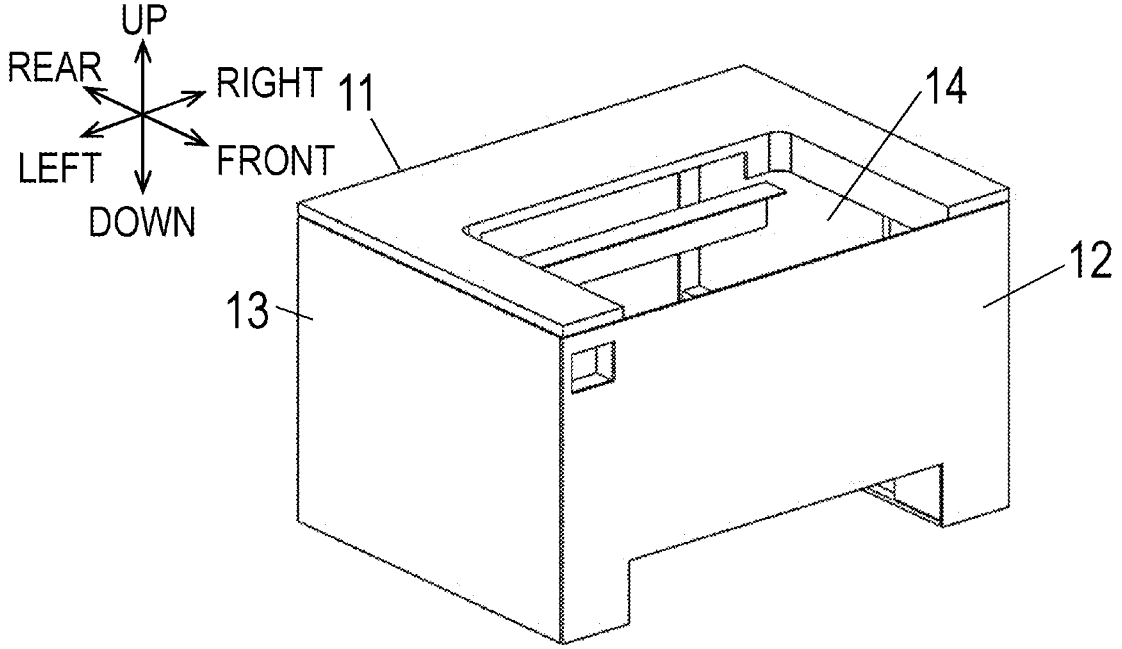
FIG. 13A to FIG. 13C are diagrams illustrating the positional relationship between the covers according to the first embodiment.
Figure 13B:
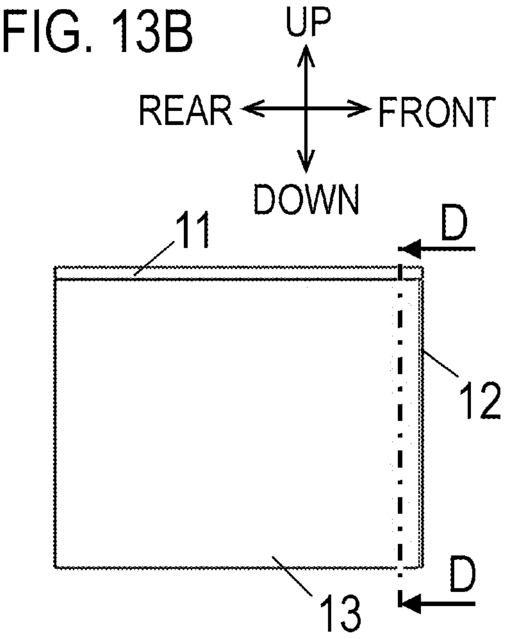
Figure 13C:
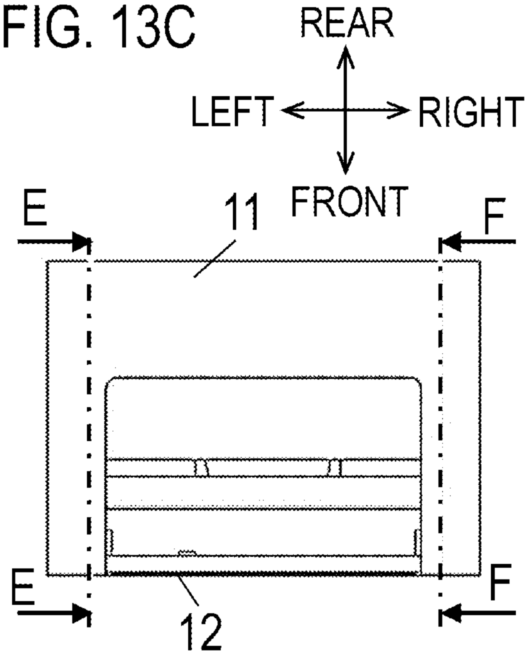
Figure 14A:
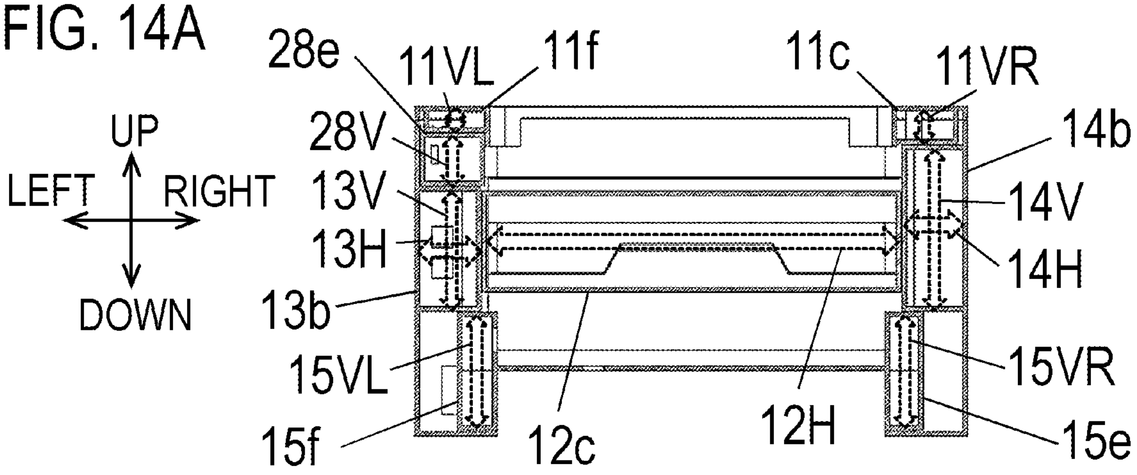
FIG. 14A to FIG. 14C are diagrams illustrating the internal configuration of the image forming apparatus according to the first embodiment.
Figure 14B:
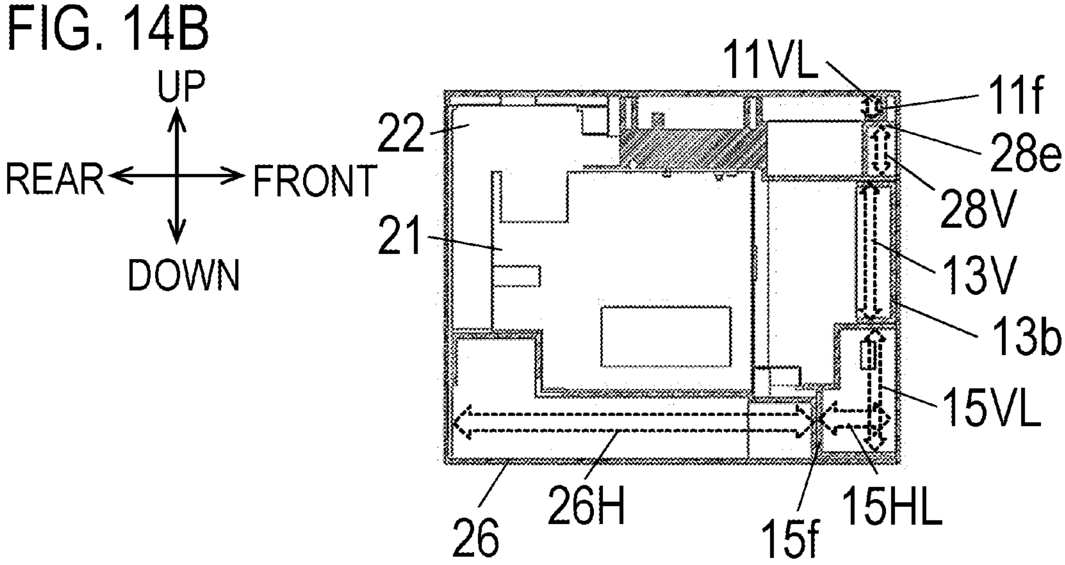
Figure 14C:
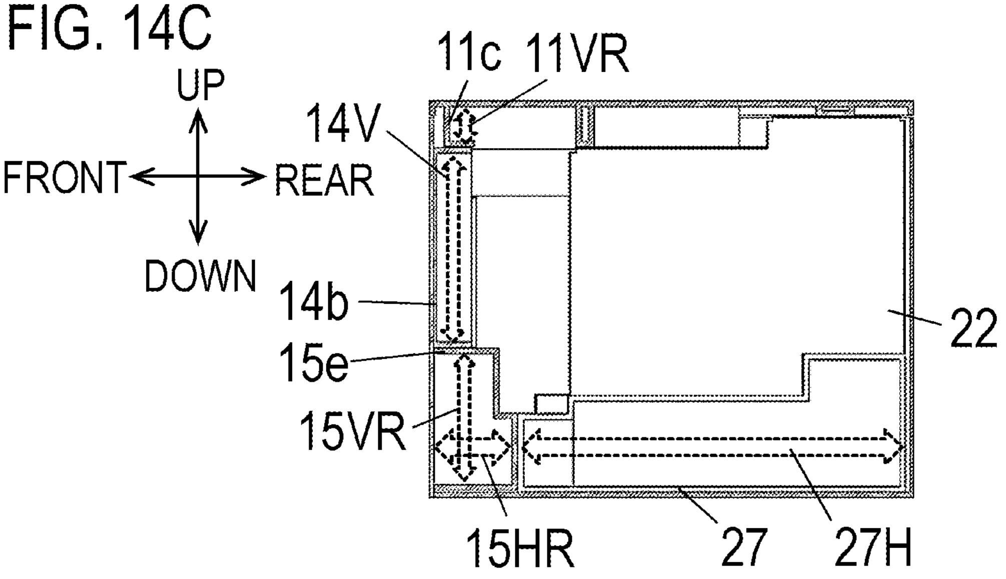

Next, how forces act on various components when external forces are applied to the image forming apparatus 100 is described. FIG. 13A is a perspective view of the apparatus of FIG. 11 according to this embodiment with the front cover 12 added thereto. FIG. 13B is a left side view thereof, and FIG. 13C is a top plan view thereof. FIG. 14A is a D-D cross section of FIG. 13B viewed from the front, FIG. 14B is an E-E cross section of FIG. 13C viewed from the left, and FIG. 14C is an F-F cross section of FIG. 13C viewed from the right. Forces that act on various members are indicated by dot-line arrows in FIG. 14A to FIG. 14C. Some examples of cases where an external force is applied in the up and down direction, left and right direction, and front and back direction of the image forming apparatus 100 will be described below.

An external force acting in the up and down direction in the right front of the apparatus is received by the right front support portion 11*c* of the upper cover 11, the support portion 14*b* of the right cover 14, and the right front support portion 15*e* of the lower cover 15 as load 11VR, load 14V, and load 15VR, respectively. Namely, in the right front of the apparatus, the support portions of various members adjoin each other in the up and down direction from the upper end to the lower end of the image forming apparatus 100, so that the apparatus has high rigidity against external forces in the up and down direction.

An external force acting in the up and down direction in the left front of the apparatus is received by the left front support portion 11*f* of the upper cover 11 and the display screen support portion 28*e* of the support member 28 as load 11VL and load 28V, respectively. Moreover, the support portion 13*b* of the left cover 13 receives load 13V, and the left front support portion 15*f* of the lower cover 15 receives load 15VL. Namely, in the left front of the apparatus, too, the support portions of various members adjoin each other in the up and down direction from the upper end to the lower end of the image forming apparatus 100, so that the apparatus has high rigidity against external forces in the up and down direction.

An external force acting in the left and right direction in the front of the apparatus is received by the support portion 14*b* of the right cover 14, the support portion 12*c* of the front cover 12, and the support portion 13*b* of the left cover 13 as load 14H, load 12H, and load 13H, respectively. Namely, in the front of the apparatus, various members adjoin each other in the left and right direction from the right end to the left end of the image forming apparatus 100, so that the apparatus has high rigidity against external forces in the left and right direction.

An external force acting in the front and back direction in the lower left of the apparatus is received by the lower left frame 26 and the left front support portion 15*f* of the lower cover 15 as load 26H and load 15HL, respectively. Namely, in the lower left of the apparatus, various members adjoin each other in the front and back direction from the front end to the rear end of the image forming apparatus 100, so that the apparatus has high rigidity against external forces in the front and back direction.

An external force acting in the front and back direction in the lower right of the apparatus is received by the lower right frame 27 and the right front support portion 15*e* of the lower cover 15 as load 27H and load 15HR, respectively. Namely, in the lower right of the apparatus, too, various members adjoin each other in the front and back direction from the front end to the rear end of the image forming apparatus 100, so that the apparatus has high rigidity against external forces in the front and back direction.

The support portions described above may either be configured to be always in contact with each other, or to have a gap therebetween when no external forces are loaded, the support portions making contact with each other and providing support when the respective members are loaded and flexed.

As described above, according to the present invention, the support member supports the wireless communication substrate including the antenna at a position near the outside in the image forming apparatus, and also supports the housing. Therefore, good communication performance is secured, as well as the wireless communication substrate can be protected in a sturdy manner. Namely, an image forming apparatus with a sturdy protection for the wireless communication substrate as well as good communication performance can be provided by using the support member that supports the upper cover for supporting the wireless communication substrate, and by a suitable layout of various members to secure the rigidity of the apparatus. Moreover, an unnecessary increase in production cost can be avoided by using the support member that supports the housing including the cover, to provide support for the wireless communication substrate, rather than adding another component for supporting the substrate.

Second Embodiment

Next, the configuration of an image forming apparatus 200 according to a second embodiment of the present invention is described with reference to FIG. 15 to FIG. 19. Elements similar to those of the first embodiment are given the same reference numerals and not described again. The second embodiment includes a document scanner 101 on top of the image forming apparatus shown in the first embodiment and is similar to the first embodiment with respect to other features and internal configurations.

Figure 15:
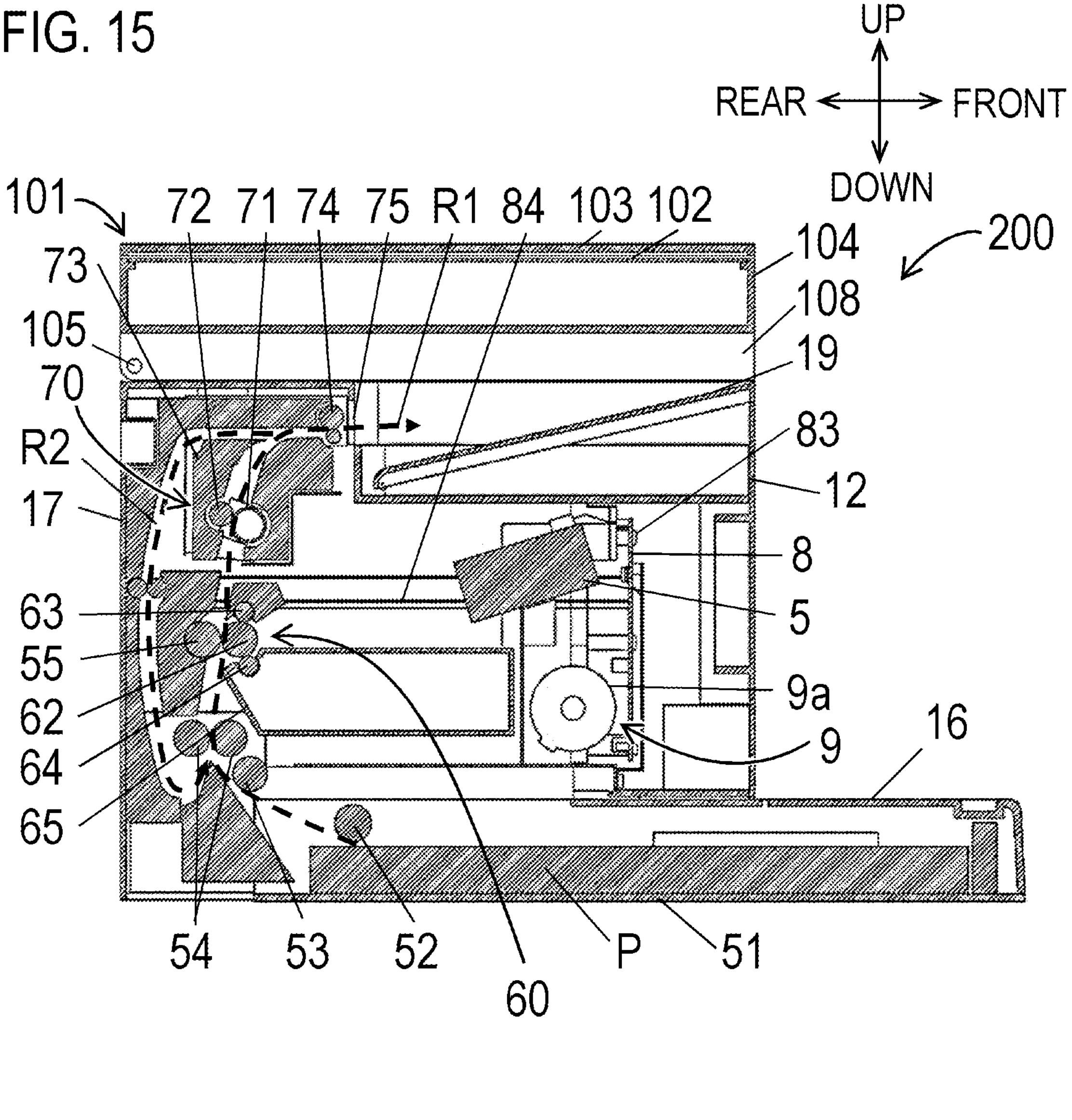
FIG. 15 is a diagrammatic cross-sectional view of an image forming apparatus according to a second embodiment.
Figure 16A:
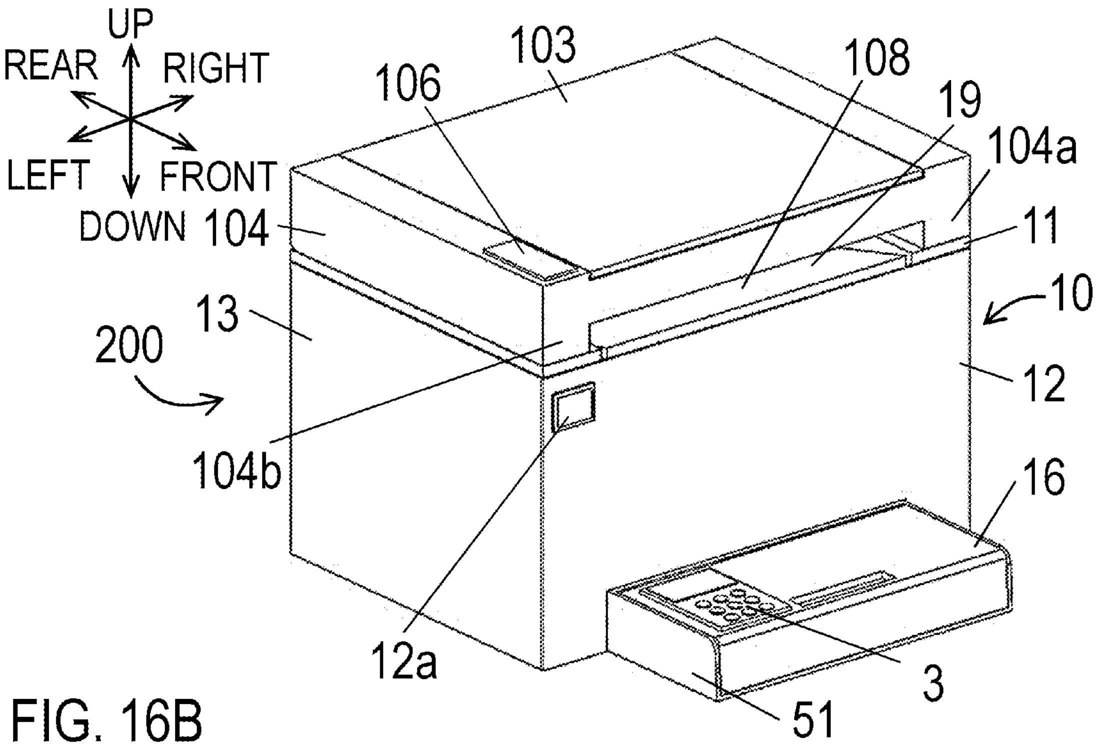
FIG. 16A and FIG. 16B are perspective views of the image forming apparatus according to the second embodiment.
Figure 16B:
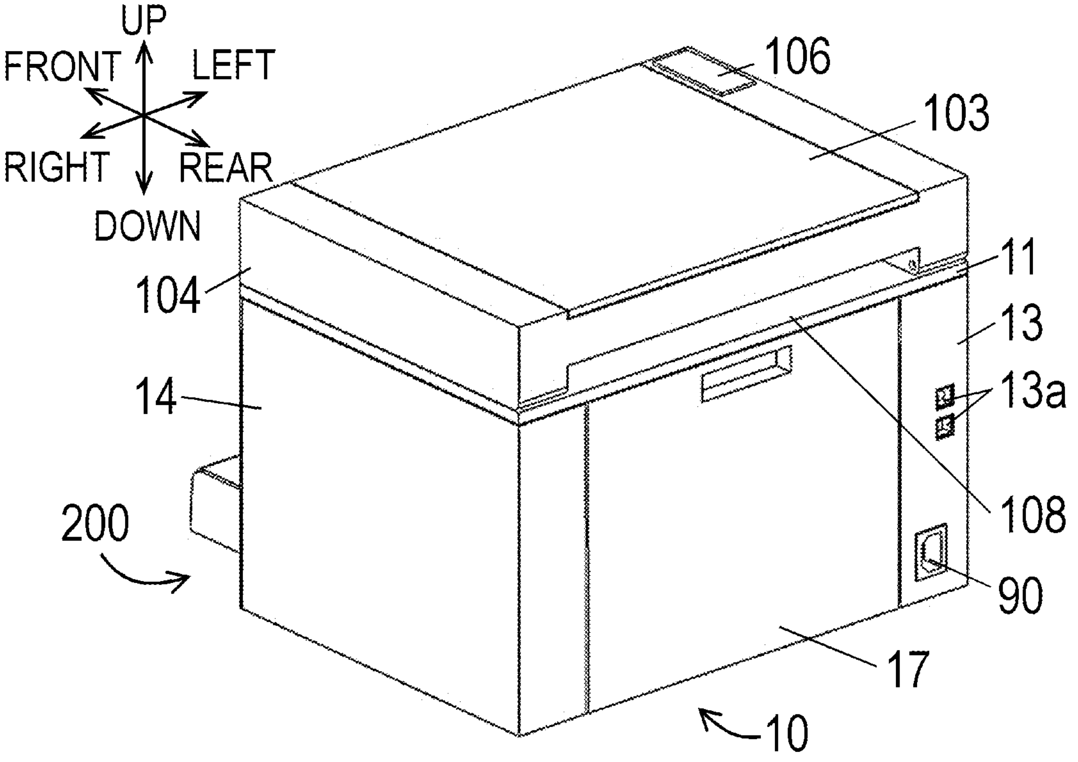

First, the overall configuration of the image forming apparatus 200 is described. FIG. 15 is a diagrammatic cross-sectional view illustrating an overall configuration of the image forming apparatus 200 that uses an electrophotographic recording technique according to this embodiment, with a document scanner 101 at the top, as viewed from the left. FIG. 16A is a perspective view of the image forming apparatus 200 according to this embodiment viewed from the front of the apparatus, and FIG. 16B is a perspective view of the image forming apparatus 200 according to this embodiment viewed from the back of the apparatus. The document scanner 101 provided at the top of the image forming apparatus 200 is primarily made up of a document glass 102, a lid 103 that covers the document glass 102, a housing 104 that covers the entire document scanner 101 and forms the chassis thereof, and an operation instruction unit 106. A hinged support portion 105 rotatably supports the document scanner 101 to allow it to open and close, and to position the document scanner 101 relative to the upper cover 11 and other members. FIG. 15, FIG. 16A, and FIG. 16B illustrate the document scanner 101 closed and in contact with the upper cover 11. The document scanner 101 is formed with a recess 108, to allow printed sheets of paper to be stacked in the hollow part between the recess 108 and the upper cover 11. This configuration wherein the document scanner 101 is provided with a hollow part by the recess 108 can also help discharge the heat generated in the fixing portion 70 to the back of the image forming apparatus 200. The image forming apparatus 200 of this embodiment has the operation instruction portion 3 on the cassette cover 16, and further, the operation instruction unit 106 having an operation instruction portion 106*a* for sending instructions to the document scanner 101 is provided on the document scanner 101. The operation instruction portions may be integrated to one and provided to only one of them.

Figure 17:
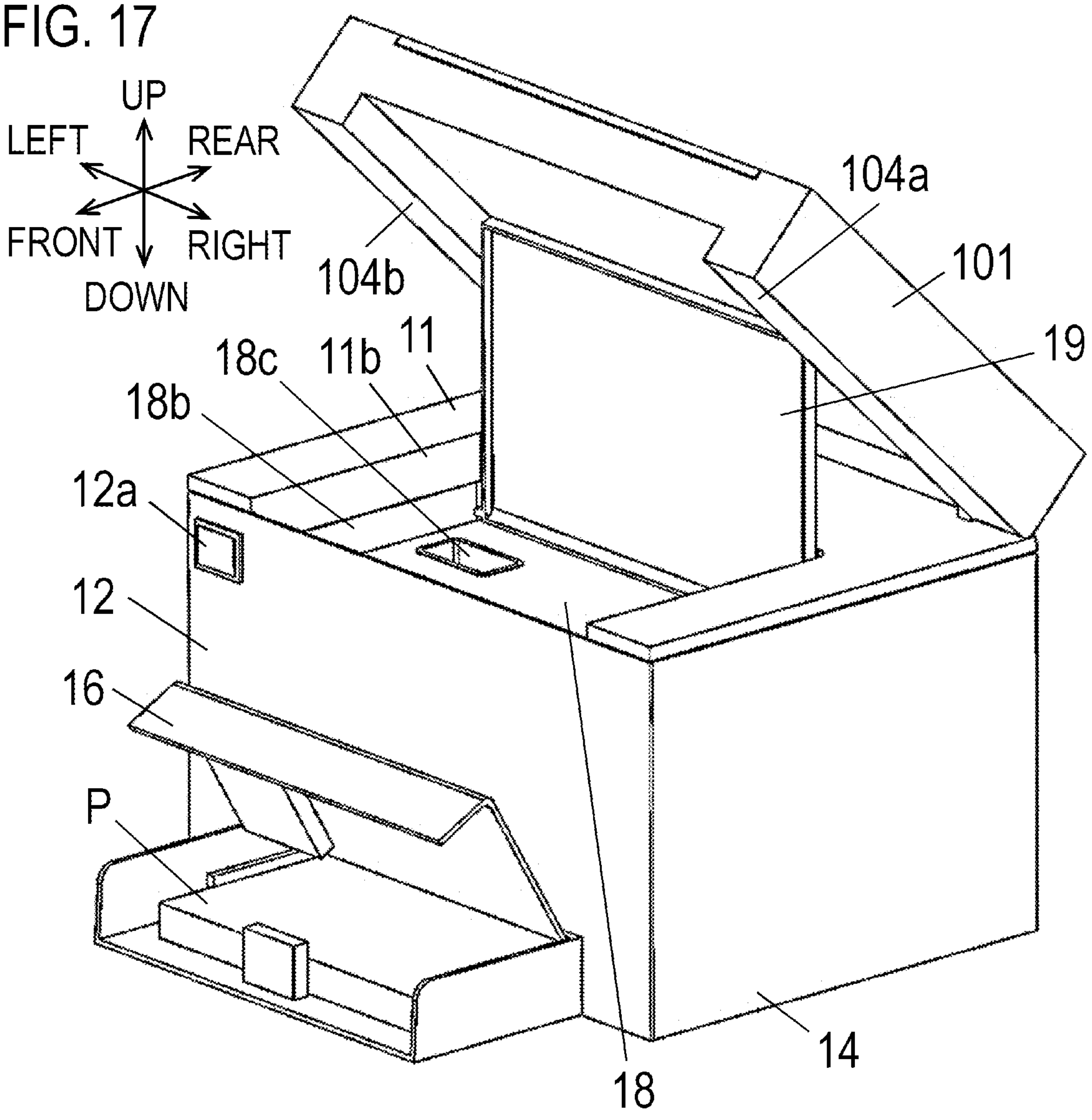
FIG. 17 is a perspective view of hinged members according to the second embodiment in an open state.

FIG. 17 is a perspective view illustrating the image forming apparatus 200 according to this embodiment, with the document scanner 101 and paper receiving tray 19 both being lifted up and open. The paper receiving tray 19 and document scanner 101 of this embodiment are supported such that they can be opened and closed relative to the main body of the image forming apparatus. Disposables such as toner can be fed from a feed port 18*c* provided to the inner cover 18 when the paper receiving tray 19 and document scanner 101 are opened. The inner cover 18 has the feed port 18*c* located more to the left, closer to each of the disposables-related display 12*a*, operation instruction portion 106*a*, and operation instruction portion 3. Namely, the displays and instruction portions are positioned close to the feed port 18*c* to make it easier for the user to recognize the relevance. Optionally, a link mechanism may be used to cause the document scanner 101 to open at the same time as the paper receiving tray 19 in a linking manner, or to cause the paper receiving tray 19 to open at the same time as the document scanner 101 in a linking manner, to allow the user access to the feed port 18*c* in one operation.

The hinged support portion 105 is disposed at the back of the apparatus near the rear surface so as to allow the document scanner 101 to open widely, facing forward. When the document scanner 101 is closed, the hinged support portion 105 at the back provides support, and the document scanner 101 is supported also by a right support portion 104*a* and a left support portion 104*b* of the housing 104 of the document scanner 101 making contact with the top surface of the upper cover 11.

Figure 18:
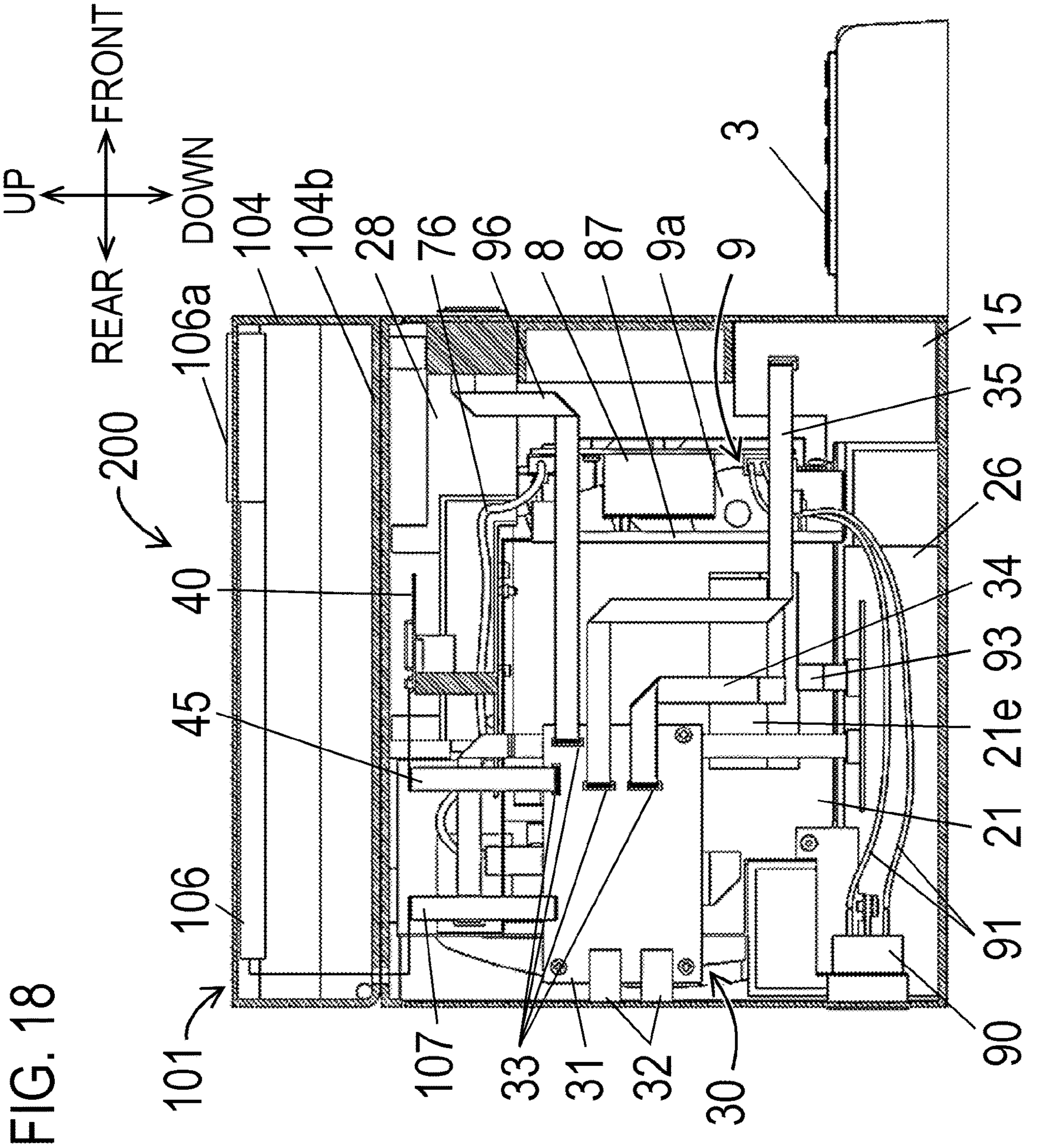
FIG. 18 is a cross-sectional view illustrating an internal configuration of the image forming apparatus according to the second embodiment.
Figure 19:
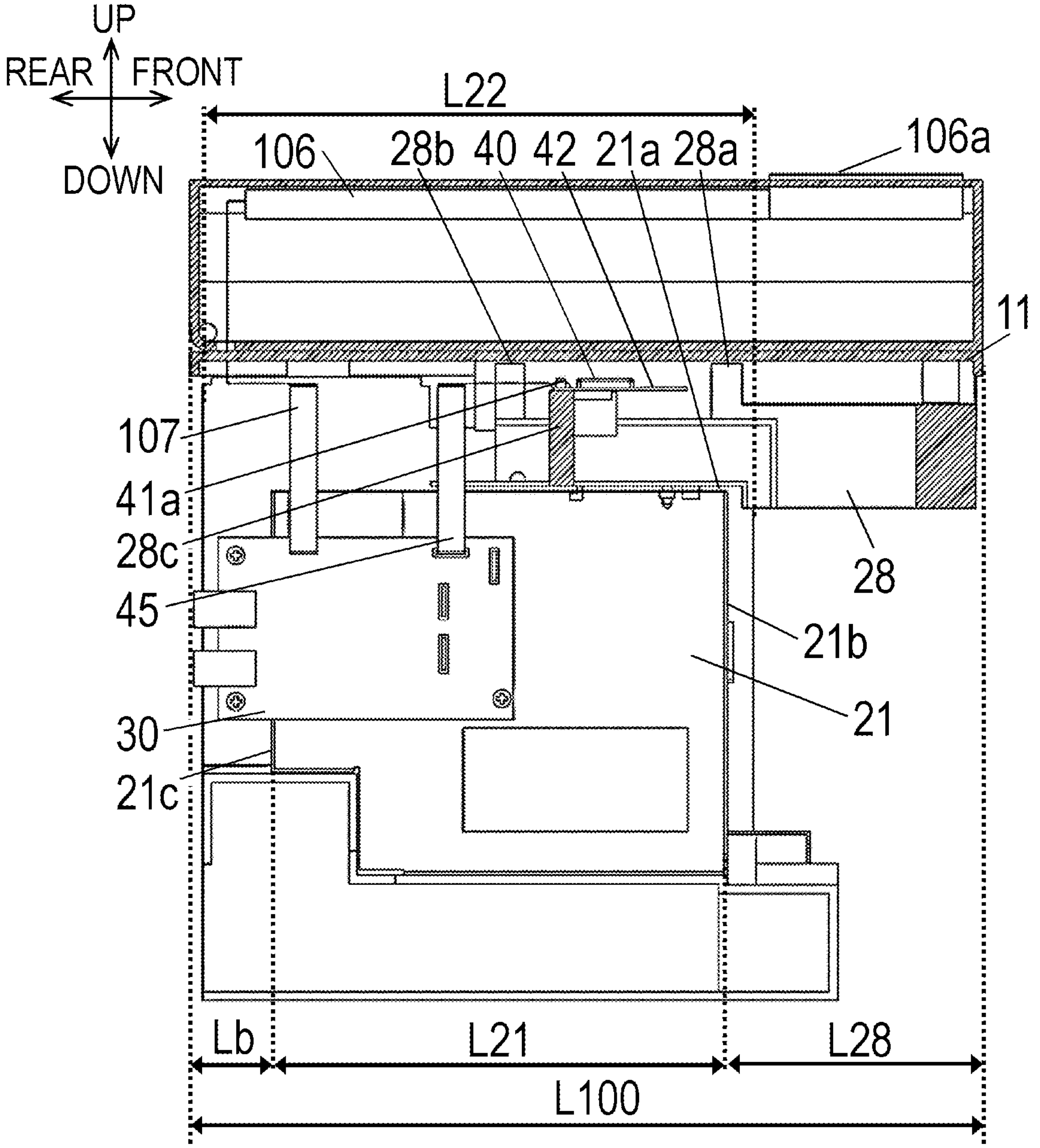
FIG. 19 is a cross-sectional view illustrating a wireless communication substrate and peripheral components according to the second embodiment.

Next, the internal structure of the image forming apparatus 200 is described. FIG. 18 is a cross-sectional view of the image forming apparatus 200 viewed from the left. FIG. 19 is a cross-sectional view of the frame 20, upper cover 11, wireless LAN module 40, control substrate unit 30, and document scanner 101 according to this embodiment, viewed from the left. The operation instruction portion 106*a* provided at the top of the operation instruction unit 106 is connected to the control substrate unit 30 by an FFC 107 passing through the housing 104 and upper cover 11.

In this embodiment, too, the support member 28 supports the wireless LAN module 40 such that the wireless LAN module 40 is positioned higher than the left frame 21 that is made of metal, as well as supports the upper cover 11. Components that could compromise the communication performance such as metal members are positioned away from the wireless LAN module 40, so that good communication performance is secured. Moreover, the support portions of various members such as frames and covers adjoin each other, so that the image forming apparatus has high rigidity against external forces.

As described above, according to the present invention, even with a document scanner provided at the top, the apparatus can be configured such that the support member that supports the housing also supports the wireless communication substrate including the antenna at a position near the outside in the image forming apparatus. Thus good communication performance is secured, as well as the wireless communication substrate can be protected in a sturdy manner. Namely, an image forming apparatus with reliable rigidity and good communication performance can be provided by using the support member that supports the upper cover for supporting the wireless communication substrate, and by a suitable layout of various members.

Third Embodiment

Figure 21A:
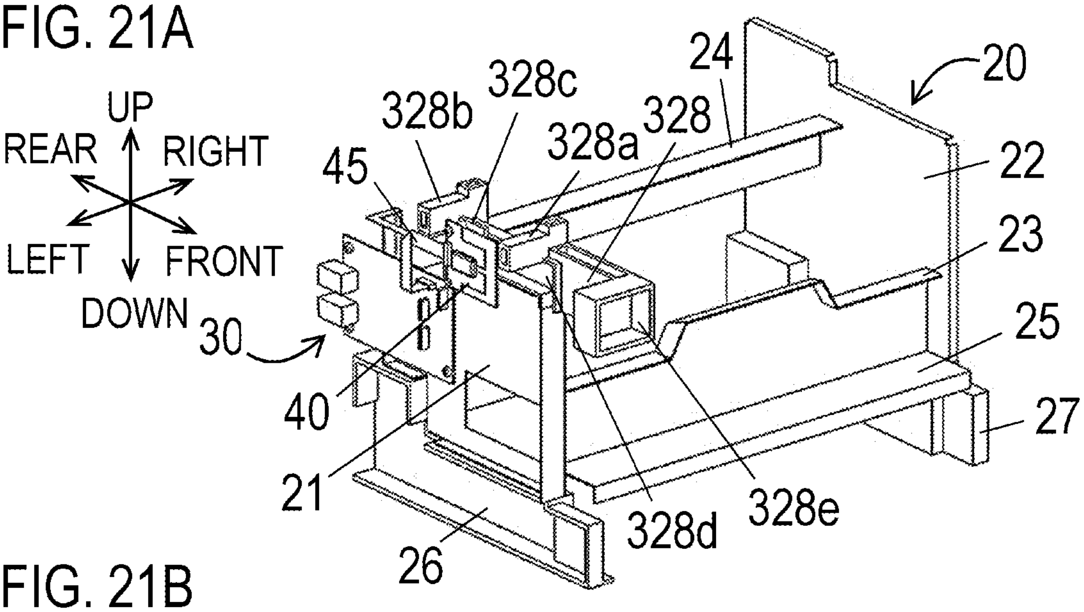
FIG. 21A to FIG. 21C are diagrams illustrating a wireless communication substrate and peripheral components according to the third embodiment.
Figure 21B:
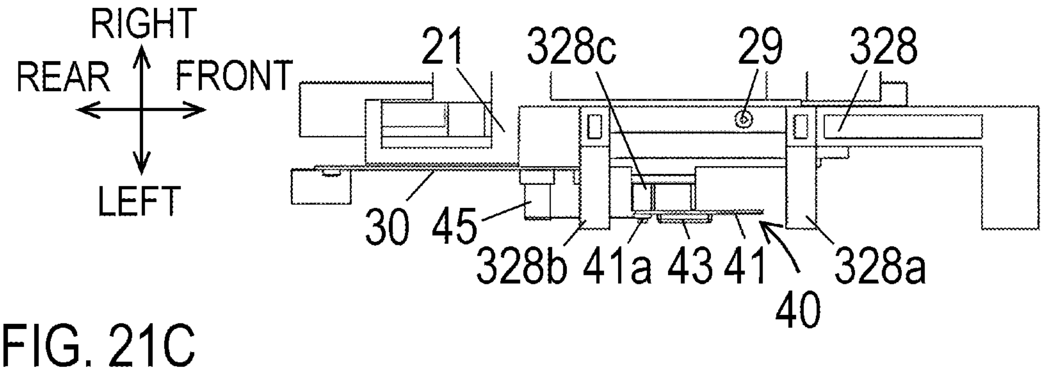
Figure 21C:
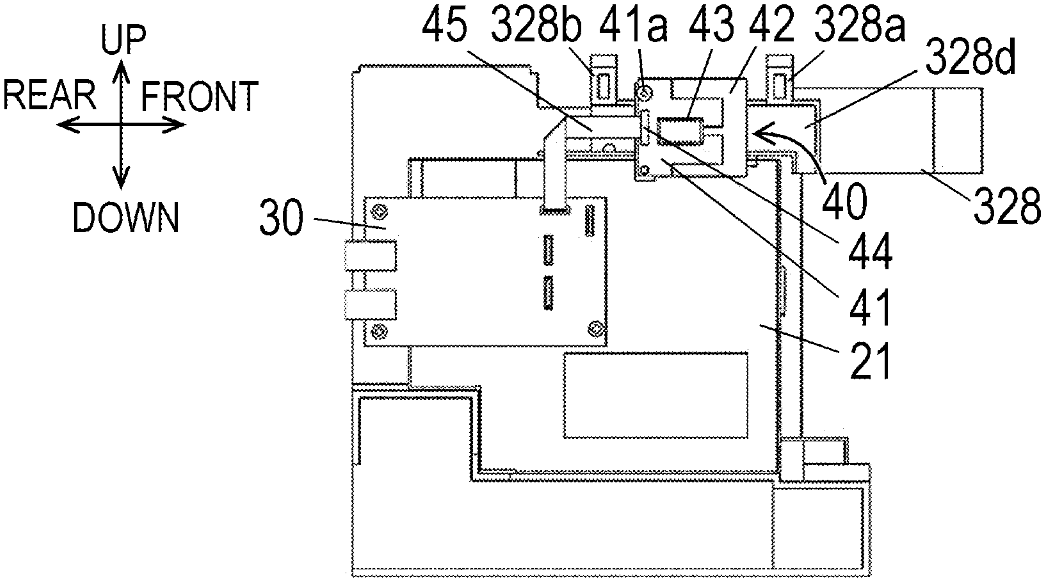
Figure 22:
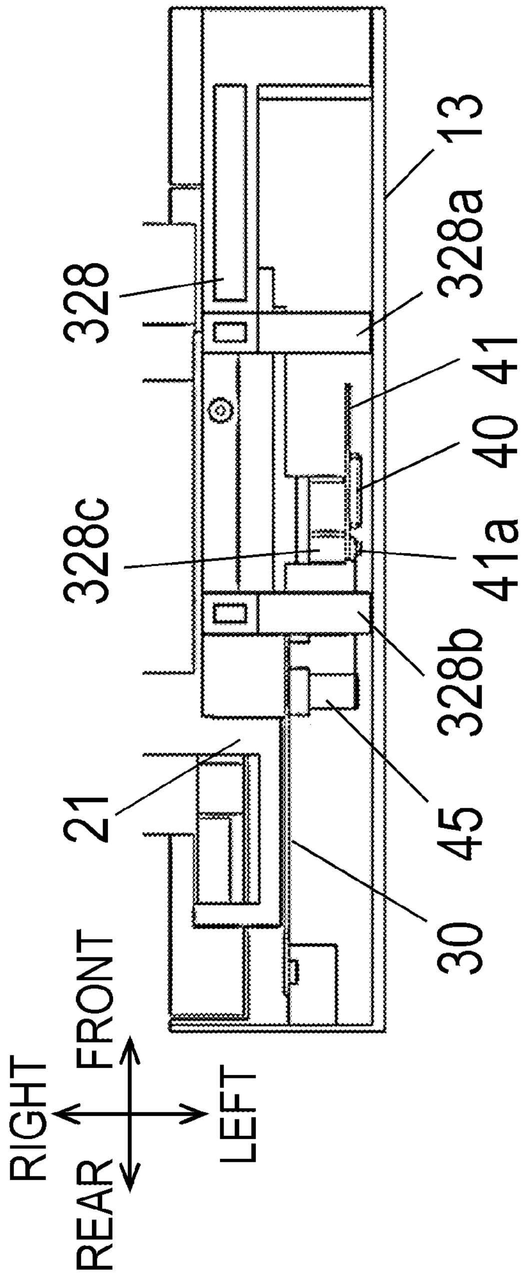
FIG. 22 is a diagram illustrating a wireless communication substrate and a left cover according to the third embodiment.

Next, the configuration of an image forming apparatus 300 according to a third embodiment of the present invention is described with reference to FIG. 20 to FIG. 22. Elements similar to those of the first embodiment are given the same reference numerals and not described again. The third embodiment is different from the first embodiment in that the substrate 41 of the wireless LAN module 40 does not face upward but to the left, and that the support member supports the left frame in addition to the upper frame. The outer appearance of the image forming apparatus 300 according to this embodiment is similar to that of the image forming apparatus 100 according to the first embodiment and therefore will not be described again.

Figure 20:
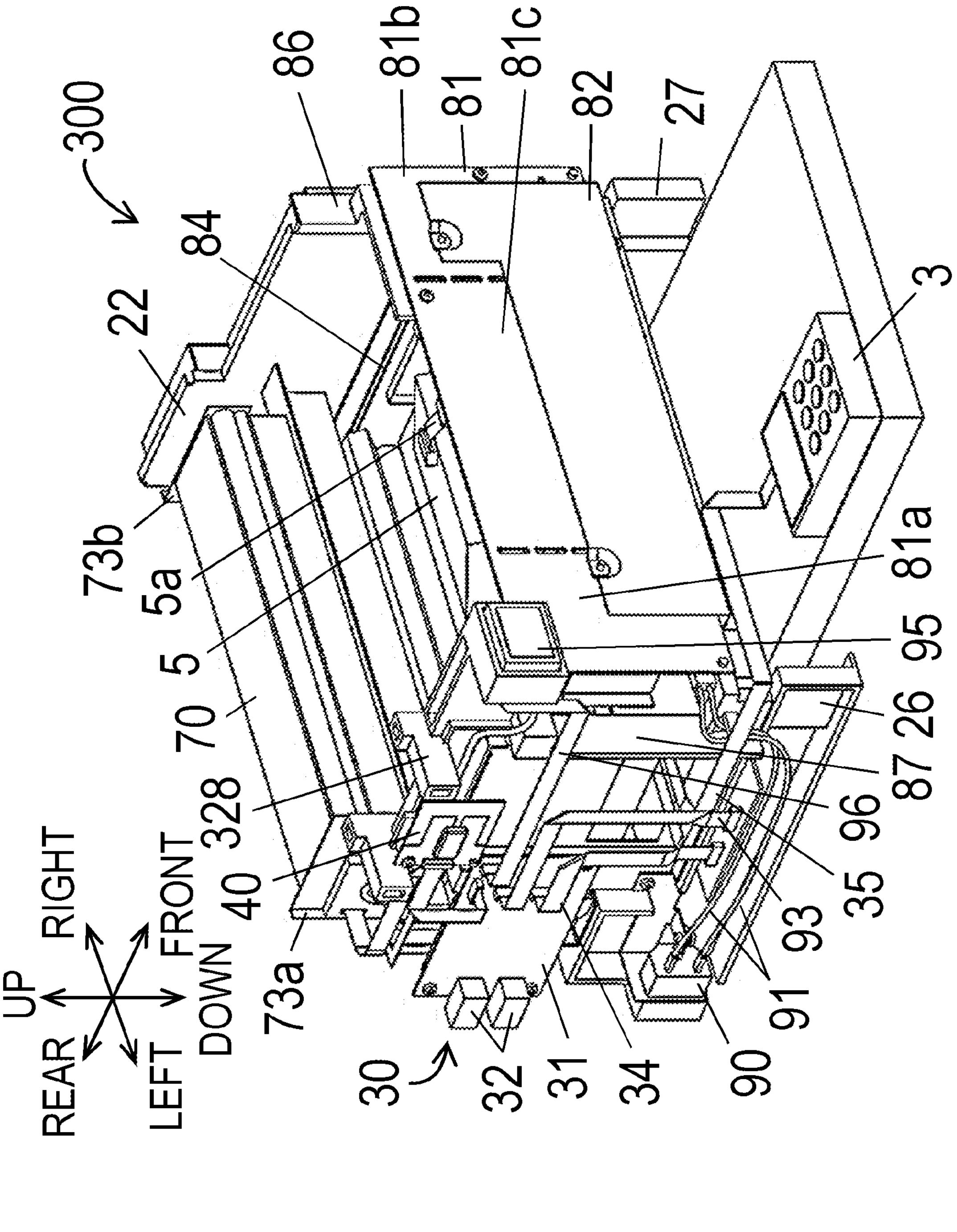
FIG. 20 is a perspective view illustrating an internal configuration of an image forming apparatus according to a third embodiment.

FIG. 20 is a perspective view of the image forming apparatus 300 according to this embodiment where the cover 10 is not shown. FIG. 21A is a perspective view illustrating the wireless LAN module 40, frame 20, and control substrate unit 30 according to this embodiment, FIG. 21B is a top plan view thereof, and FIG. 21C is a left side view thereof. FIG. 22 is a top plan view illustrating the wireless LAN module 40, frame 20, control substrate unit 30, and left cover 13 according to this embodiment.

The support member 328 is a structure fixed to the left frame 21 and providing the function of supporting various components, and the function of maintaining the rigidity of the image forming apparatus 300 similarly to the first embodiment. The support member 328 includes a front support portion **328*a* and a rear support portion 328*b* that support the upper cover 11 and left cover 13. The support member 328 further includes a substrate support portion 328*c* that supports the wireless LAN module 40, a wire bundle holding portion 328*d* that holds bundled wires, and a display screen support portion 328*e* that supports the disposables-related display 12*a*. The support member 328 also has a hook that engages with the upper surface 21*a* of the left frame 21, and is fixed to the upper surface 21*a* of the left frame 21 by the hook and a screw 29**.

Since the support member 328 is fixed to the left frame 21, a rightward external force applied to the left cover 13 is received by the support member 328 via the left cover 13 as a rightward load and transmitted to the left frame 21. The left frame 21 that receives the rightward load is supported by the front frame 23 and rear frame 24 that have high rigidity in the left and right direction. Therefore, the image forming apparatus 300 as a whole has high rigidity against external forces in the left and right direction. The support member 328 may keep the upper cover 11 and left cover 13 in fixed positions, or may be configured separable therefrom, with a small gap therebetween, so that when the respective covers are pressed, the covers make contact with the support member 328. In either configuration, the two engagement portions, i.e., the front support portion **328*a* and rear support portion 328*b*, stably keep the support member 328, upper cover 11, and left cover 13 at their positions relative to each other. The wireless LAN module 40 is fixed to the support member 328 as described above. Namely, the wireless LAN module 40, upper cover 11, and left cover 13 are stably kept at their positions relative to each other. The wireless LAN module 40 is further supported by the substrate support portion 328*c* that is positioned between the front support portion 328*a* and the rear support portion 328*b* in the front and back direction. Namely, the support member 328 has the substrate support portion 328*c* serving as the antenna support portion positioned between the front support portion 328*a* and the rear support portion 328*b* serving as housing support portions. This configuration ensures that the wireless LAN module 40 is stably kept at a distance from the upper cover 11 and left cover 13 even when the upper cover 11, left cover 13**, or the apparatus temporarily undergoes deformation by an external force.

The support member 328 is a relatively sturdy component among the parts of the image forming apparatus in order to support the upper cover 11 and left cover 13. Therefore, deformation, if any, in the support member when the entire apparatus is subjected to vibration or impact during transportation of the apparatus is lighter than that of common components, so that there is little risk of the upper cover 11 or left cover 13 interfering with the wireless LAN module 40. Moreover, the shape of the support for the wireless LAN module 40 is relatively simple and offers a high degree of freedom, so that shapes that may become an obstacle for wireless communication can be avoided. Also, the support member 328 is producible at a relatively low cost. All these help significantly reduce the risk of collision between the wireless LAN module 40 supported by the support member 328, and the upper cover 11 and left cover 13, even though they are positioned in proximity to each other. In other words, the wireless LAN module 40 can be disposed at a position as high and far to the left as possible in the image forming apparatus 300 without adding a component for this specific purpose.

As described above, according to the present invention, even in the case where the wireless communication substrate is disposed to face to one side, the apparatus can be configured such that the support member that supports the housing also supports the wireless communication substrate including the antenna at a position near the outside in the image forming apparatus. Thus good communication performance is secured, as well as the wireless communication substrate can be protected in a sturdy manner. Namely, an image forming apparatus with a sturdy protection for the wireless communication substrate as well as good communication performance can be provided by using the support member that supports the upper cover and left cover for supporting the wireless communication substrate, and by a suitable layout of various members.

The above-described embodiment in which the support member is configured to support both the upper cover and left cover should not be construed as limiting. The support member may be configured not to support the upper cover, and to support the left cover alone. The support member not supporting the upper cover herein refers to a state where the support member is not in contact with the upper cover, with a gap between the support member and the upper cover large enough to keep the support member out of contact with the upper cover even when an external force is applied to the upper cover from above.

The cover in the embodiments described above is made up of a plurality of members such as an upper cover and a left cover. The cover may instead be an integrally formed cover that is inseparable. Such a cover can also protect the wireless communication substrate in a sturdy manner while securing good communication performance, by a configuration whereby the support member supports a surface close to the wireless communication substrate.

The embodiments described above are examples of configurations in which a wireless LAN module 40, in particular a Wi-Fi module, is used as the wireless communication substrate. The present invention is not limited to this and can be applied to cases where the wireless communication substrate is one of the modules of other communication systems such as Near Field Communication (NFC) or Bluetooth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205775 filed on Dec. 20, 2021, which is hereby incorporated by reference herein in its entirety.

What is claimed is:

1. An image forming apparatus comprising:

an image forming portion configured to form an image on a recording material;

a first metal side plate and a second metal side plate provided opposite each other with respect to the image forming portion, the first metal side plate and the second metal side plate extending in an extension direction;

an antenna unit including an antenna for communicating with external equipment, and a substrate on which the antenna is provided;

a housing including a top cover provided above the first metal side plate and the second metal side plate in a vertical direction; and a support member provided on the first metal side plate, and the support member including (i) an antenna support portion supporting the substrate so that a lowermost end of the substrate is positioned higher than an uppermost end of the first metal side plate in a vertical direction, and (ii) a first support portion configured to support the top cover so that the top cover is away from the antenna unit.

2. The image forming apparatus according to claim 1, wherein the support member includes a second support portion configured to support the top cover so that the top cover is away from the antenna unit.

3. The image forming apparatus according to claim 2, wherein the antenna unit is positioned between the first support portion and the second support portion in the extension direction.

4. The image forming apparatus according to claim 3, wherein the second support portion is:

disposed away from the top cover; and configured to contact the top cover when the top cover is deformed by an external force in the vertical direction.

5. The image forming apparatus according to claim 1, wherein the antenna support portion is provided at a position not overlapping the first support portion as viewed from a direction orthogonal to a surface of the first metal side plate facing the second metal side plate.

6. The image forming apparatus according to claim 1, wherein the support member is made of resin.

7. The image forming apparatus according to claim 1, wherein the housing is made of resin.

8. The image forming apparatus according to claim 1, wherein the housing is configured of a plurality of members.

9. The image forming apparatus according to claim 1, wherein the first metal side plate is shorter than the second metal side plate in the extension direction.

10. The image forming apparatus according to claim 9, wherein:

the housing is provided with a discharge port that discharges the recording material, on which the image is formed by the image forming portion, from one end in the extension direction toward another end on an opposite side from the one end, and the first metal side plate is disposed closer to the one end than to the another end in the extension direction.

11. The image forming apparatus according to claim 9, further comprising:

a feeder cassette that stores the recording material and is insertable into and extractable from the housing, wherein the feeder cassette is pullable out from one end in the extension direction toward another end on an opposite side from the one end, and wherein the first metal side plate is disposed closer to the one end than to the another end in the extension direction.

12. The image forming apparatus according to claim 9, further comprising:

an operation portion for a user to operate, wherein the operation portion is provided on another end on an opposite side from one end in the extension direction, and wherein the first metal side plate is disposed closer to the one end than to the another end in the extension direction.

13. The image forming apparatus according to claim 1, further comprising:

a display portion configured to display predetermined information, wherein the support member includes a display support portion supporting the display portion.

14. The image forming apparatus according to claim 1, wherein:

the first metal side plate includes a first end and a second end opposite to the first end in the extension direction, and the support member includes an extension portion, the extension portion being further from the first end than the second end is in the extension direction.

15. The image forming apparatus according to claim 14, further comprising:

a lower cover; and a support cover disposed between the lower cover and the extension portion, wherein in a case where an external force is applied to the top cover in the vertical direction, the extension portion, the support cover, and the lower cover are configured to receive the external force.

16. The image forming apparatus according to claim 15, further comprising:

a display portion configured to display predetermined information, wherein the extension portion supports the display portion.

17. The image forming apparatus according to claim 1, wherein the first support portion is:

disposed away from the top cover; and configured to contact the top cover when the top cover is deformed by an external force in the vertical direction.

* * * * *